United States Patent
Shimada et al.

(10) Patent No.: US 12,327,057 B2
(45) Date of Patent: Jun. 10, 2025

(54) INFORMATION PROCESSING APPARATUS, CONTROL METHOD OF INFORMATION PROCESSING APPARATUS, AND STORAGE MEDIUM FOR ACQUIRING CAPABILITY INFORMATION ABOUT A PRINTER

(71) Applicant: CANON KABUSHIKI KAISHA, Tokyo (JP)

(72) Inventors: Kazushige Shimada, Chiba (JP); Kazuyuki Saito, Kanagawa (JP); Shinya Suzuki, Chiba (JP); Akihiro Yasuda, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/298,950

(22) Filed: Apr. 11, 2023

(65) Prior Publication Data
US 2023/0333792 A1    Oct. 19, 2023

(30) Foreign Application Priority Data

Apr. 18, 2022 (JP) .................. 2022-068062

(51) Int. Cl.
*G06F 3/12* (2006.01)

(52) U.S. Cl.
CPC .......... *G06F 3/1258* (2013.01); *G06F 3/1205* (2013.01); *G06F 3/1264* (2013.01); *G06F 3/1287* (2013.01)

(58) Field of Classification Search
None
See application file for complete search history.

(56) References Cited

U.S. PATENT DOCUMENTS

| | | | |
|---|---|---|---|
| 2020/0004477 A1* | 1/2020 | Morita | G06F 3/1232 |
| 2020/0310702 A1 | 10/2020 | Kai | |
| 2021/0004186 A1* | 1/2021 | Kanno | G06F 3/1205 |
| 2021/0055893 A1* | 2/2021 | Saigusa | G06F 3/1208 |
| 2021/0240412 A1* | 8/2021 | Saigusa | G06F 3/1288 |
| 2023/0333793 A1* | 10/2023 | Saito | G06F 3/1205 |
| 2023/0333794 A1* | 10/2023 | Yasuda | G06F 3/1205 |

FOREIGN PATENT DOCUMENTS

| | | |
|---|---|---|
| EP | 3859515 A1 | 8/2021 |
| JP | 2018006949 A | 1/2018 |
| JP | 2019091150 A | 6/2019 |
| JP | 2019185549 A | 10/2019 |
| JP | 2020004159 A | 1/2020 |
| JP | 2020004254 A | 1/2020 |
| JP | 2020166467 A | 10/2020 |
| JP | 2021124791 A | 8/2021 |
| JP | 2021170258 A | 10/2021 |

* cited by examiner

*Primary Examiner* — Miya J Cato
(74) *Attorney, Agent, or Firm* — Canon U.S.A., Inc. IP Division

(57) ABSTRACT

An information processing apparatus includes an acquisition unit configured to acquire capability information about a printer configured to receive print data generated by a predetermined printer driver, and a display unit configured to display an object configured to accept a print setting based on the capability information acquired by the acquisition unit. The acquisition unit is configured to acquire second capability information based on a predetermined user operation accepted after completion of acquisition of first capability information of the capability information.

36 Claims, 18 Drawing Sheets

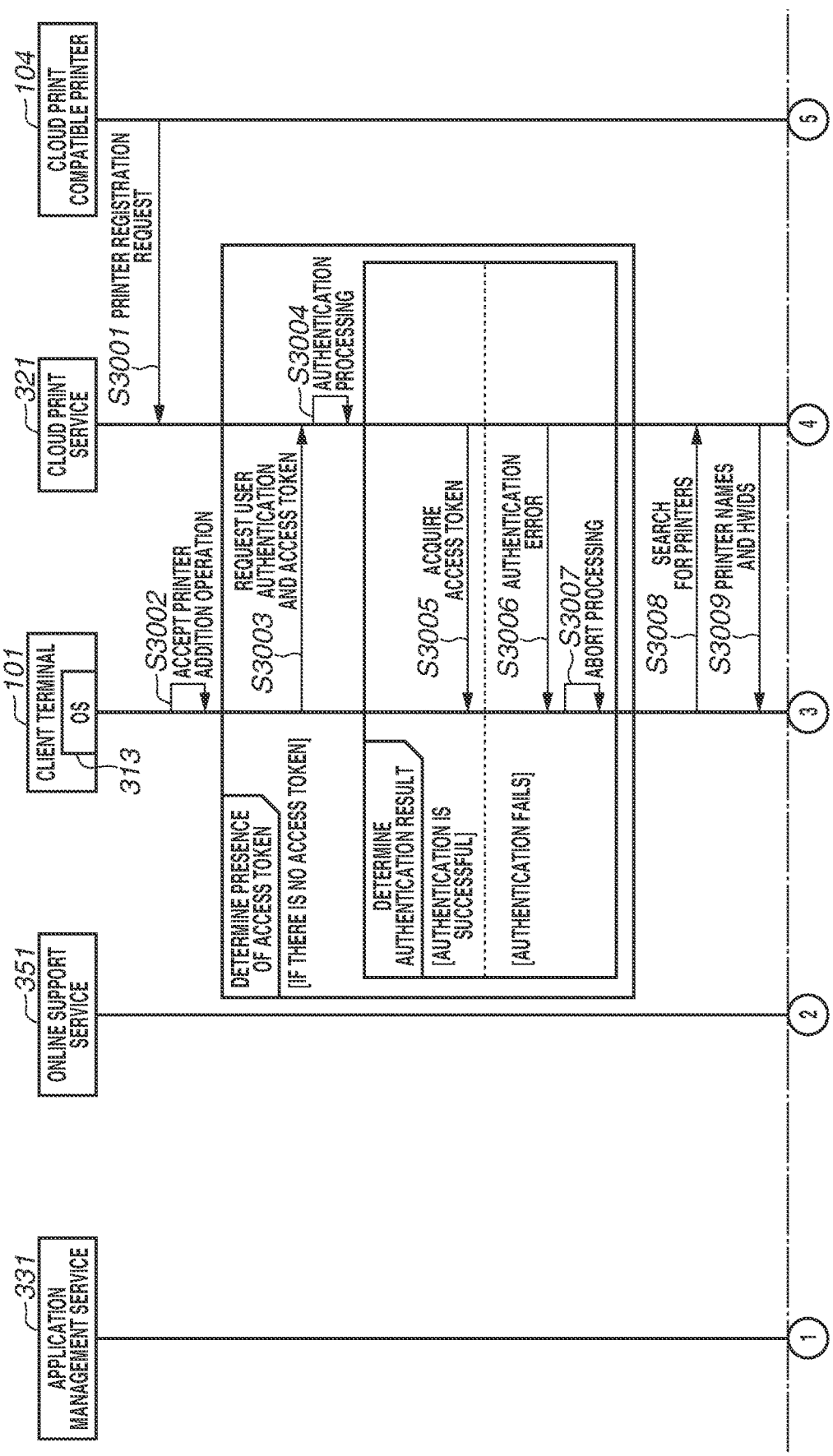

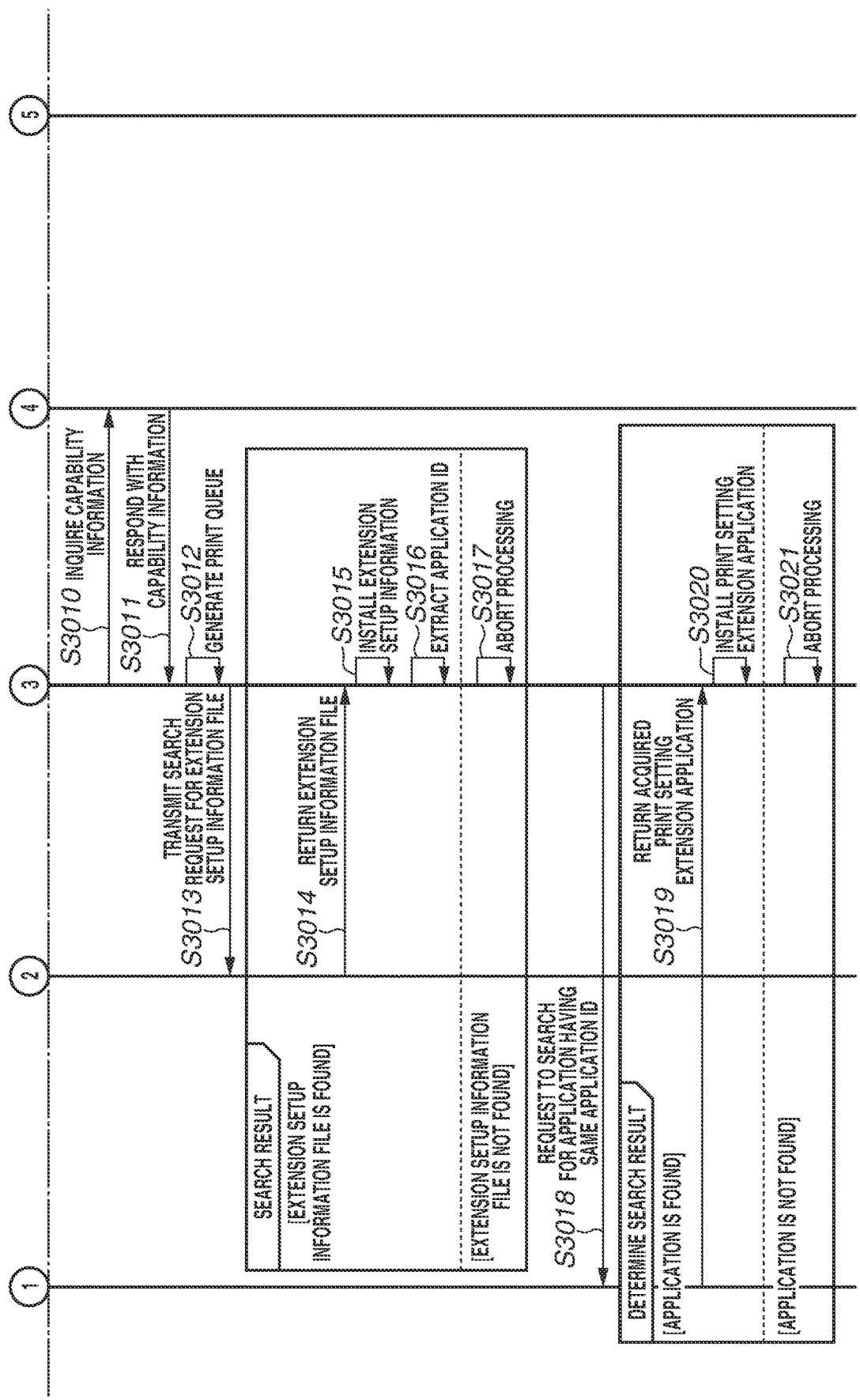

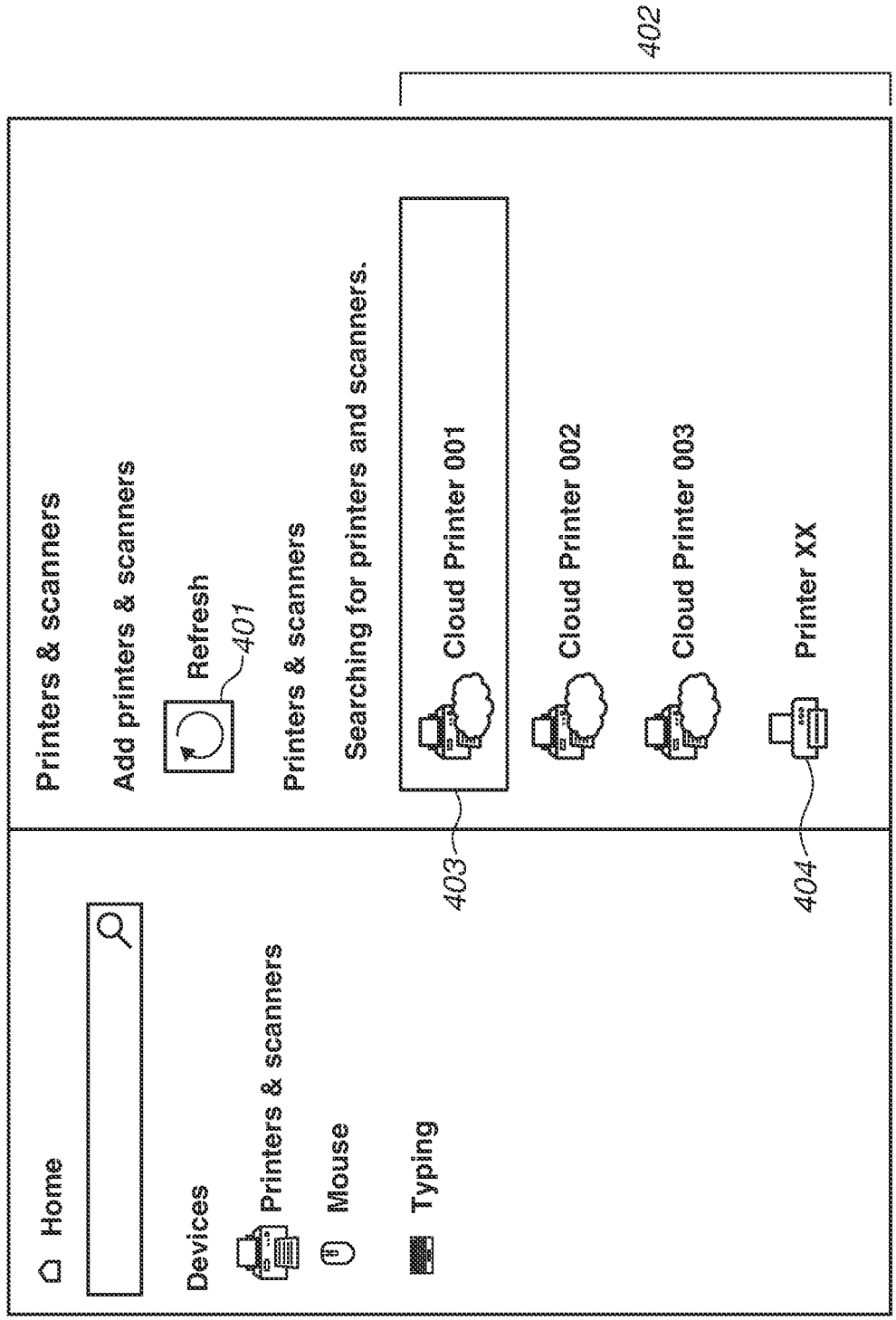

FIG.5

| | Item name | Attribute value |
|---|---|---|
| 501 | Paper size | A6/A5/A4/B5/Letter/Legal/Executive/Postcard /#10 Envelope portrait/DL Envelope portrait /Envelope (JIS Y4) portrait/Envelope (JIS N3) portrait /Envelope (JIS N4) portrait/Envelope C5 portrait /Envelope Monarch portrait/L/4 × 6/5 × 7/8 × 10/Square (127 mm) /Business card (Card)/Envelope (JIS Y6) portrait /Square (89 mm)/Square (4 × 4) |
| 502 | Paper type | Envelope/Label/Plain paper/Photographic paper /Photographic paper glossy standard /Photographic paper matte/Inkjet postcard (back) /Inkjet postcard (front) /Inkjet photographic postcard (back) /Inkjet photographic postcard (front) |
| 503 | Number of copies | Max = 99 |
| | Orientation | Portrait/Landscape |
| | Print quality | Standard/Draft |
| | Collate | ON/OFF |
| | Staple | OFF/Auto/Top left/Bottom left/Top right/Bottom right/Left (dual) /Top (dual)/Right (dual)/Bottom (dual)/Saddle stitch |
| | Punch | OFF/Punch (auto)/Punch (dual left)/Punch (triple left) /Punch (quad left)/Punch (multi left)/Punch (dual right) /Punch (triple right)/Punch (quad right)/Punch (multi right) /Punch (dual top)/Punch (triple top)/Punch (quad top) /Punch (multi top)/Punch (dual bottom)/Punch (triple bottom) /Punch (quad bottom)/Punch (multi bottom) |
| | Fold | OFF/Half fold/C-fold/Quarter fold/Six-page accordion/Z-fold /Saddle fold (output from saddle finisher) |
| 504 | Color mode | Color/Monochrome |
| | Page layout | OFF/2in1/4in1/6in1/9in1/16in1 |
| | Layout order | Left to right/Right to left |
| | Magnification | OFF/Fit to page width/Fit to screen size |
| | Two-sided printing | One-sided/Two-sided |
| | Binding location | Long edge/Short edge |
| | Rotate 180° | OFF/Counterclockwise/Clockwise |
| | Store job in printer | ON/OFF |
| | Shorten job name | ON/OFF |
| | Staple-free stapling | ON/OFF |

FIG.6A

```xml
<?xml version="1.0" encoding="utf-8"?>
<PrintDeviceCapabilities
 xmlns:xsi="http://www.w3.org/2001/XMLSchema-instance"
 xmlns:xsd="http://www.w3.org/2001/XMLSchema"
 xmlns:xml="http://www.w3.org/XML/1998/namespace"
 xmlns:psk="http://schemas.microsoft.com/windows/2003/08/printing/printschemakeywords"
 xmlns:psk12="http://schemas.microsoft.com/windows/2013/12/printing/printschemakeywordsv12"
 xmlns:psf="http://schemas.microsoft.com/windows/2003/08/printing/printschemaframework"
 xmlns:psf2="http://schemas.microsoft.com/windows/2013/12/printing/printschemaframework2"
 xmlns="http://schemas.microsoft.com/windows/2013/12/printing/printschemaframework2"
 version="2">

<psk:JobCopiesAllDocuments psf2:psftype="ParameterDef">
        <psf:DataType xsi:type="xsd:QName" psf2:psftype="Property">xsd:integer</psf:DataType>
        <psf:DefaultValue xsi:type="xsd:integer" psf2:psftype="Property">1</psf:DefaultValue>
        <psf:Mandatory xsi:type="xsd:QName" psf2:psftype="Property">psk:Unconditional</psf:Mandatory>
        <psf:MaxValue xsi:type="xsd:integer" psf2:psftype="Property">999</psf:MaxValue>
        <psf:MinValue xsi:type="xsd:integer" psf2:psftype="Property">1</psf:MinValue>
        <psf:Multiple xsi:type="xsd:integer" psf2:psftype="Property">1</psf:Multiple>
        <psf:UnitType xsi:type="xsd:string" psf2:psftype="Property">copies</psf:UnitType>
    </psk:JobCopiesAllDocuments>

<psk:PageMediaSize psf2:psftype="Feature">
        <psk:ISOA4 psf2:psftype="Option">
            <psk12:PortraitImageableSize xsi:type="psf2:ImageableAreaType" psf2:psftype="Property">12700,12700,184600,271600</psk12:PortraitImageableSize>
            <psk:MediaSizeHeight xsi:type="xsd:integer" psf2:psftype="ScoredProperty">297000</psk:MediaSizeHeight>
            <psk:MediaSizeWidth xsi:type="xsd:integer" psf2:psftype="ScoredProperty">210000</psk:MediaSizeWidth>
        </psk:ISOA4>
        <psk:NorthAmericaLetter psf2:psftype="Option" psf2:default="true">
            <psk12:PortraitImageableSize xsi:type="psf2:ImageableAreaType" psf2:psftype="Property">12700,12700,190500,254000</psk12:PortraitImageableSize>
            <psk:MediaSizeHeight xsi:type="xsd:integer" psf2:psftype="ScoredProperty">279400</psk:MediaSizeHeight>
            <psk:MediaSizeWidth xsi:type="xsd:integer" psf2:psftype="ScoredProperty">215900</psk:MediaSizeWidth>
        </psk:NorthAmericaLetter>
    </psk:PageMediaSize>

<psk:PageOrientation psf2:psftype="Feature">
        <psk:Landscape psf2:psftype="Option"/>
        <psk:Portrait psf2:psftype="Option" psf2:default="true"/>
    </psk:PageOrientation>

..................

<psk:PageOutputColor psf2:psftype="Feature">
        <psk:Color psf2:psftype="Option" psf2:default="true">
            <psk:DeviceBitsPerPixel xsi:type="xsd:integer" psf2:psftype="ScoredProperty">24</psk:DeviceBitsPerPixel>
            <psk:DriverBitsPerPixel xsi:type="xsd:integer" psf2:psftype="ScoredProperty">24</psk:DriverBitsPerPixel>
        </psk:Color>
    </psk:PageOutputColor>
</PrintDeviceCapabilities>
```

FIG.6B-1

```xml
<?xml version="1.0" encoding="UTF-8"?>
<PrintDeviceCapabilities
    xmlns:ns0000="http://schemas.microsoft.com/windows/2018/04/printing/printschemakeywords/ipp"
    xmlns:xsi="http://www.w3.org/2001/XMLSchema-instance"
    xmlns:xsd="http://www.w3.org/2001/XMLSchema"
    xmlns:xml="http://www.w3.org/XML/1998/namespace"
    xmlns:psk="http://schemas.microsoft.com/windows/2003/08/printing/printschemakeywords"
    xmlns:psk11="http://schemas.microsoft.com/windows/2013/05/printing/printschemakeywordsv11"
    xmlns:psk12="http://schemas.microsoft.com/windows/2013/12/printing/printschemakeywordsv12"
    xmlns:psf="http://schemas.microsoft.com/windows/2003/08/printing/printschemaframework"
    xmlns:psf2="http://schemas.microsoft.com/windows/2013/12/printing/printschemaframework2"
    xmlns="http://schemas.microsoft.com/windows/2013/12/printing/printschemaframework2"
    version="2">

<!-- copies-default, copies-supported -->
  <psk:JobCopiesAllDocuments psf2:psftype="ParameterDef">
      <psf:DataType psf2:psftype="Property" xsi:type="xsd:QName">xsd:integer</psf:DataType>
      <psf:DefaultValue psf2:psftype="Property" xsi:type="xsd:integer">1</psf:DefaultValue>
      <psf:Mandatory psf2:psftype="Property" xsi:type="xsd:QName">psk:Unconditional</psf:Mandatory>
      <psf:MinValue psf2:psftype="Property" xsi:type="xsd:integer">1</psf:MinValue>
      <psf:MaxValue psf2:psftype="Property" xsi:type="xsd:integer">99</psf:MaxValue>
      <psf:Multiple psf2:psftype="Property" xsi:type="xsd:integer">1</psf:Multiple>
      <psf:UnitType psf2:psftype="Property" xsi:type="xsd:string">copies</psf:UnitType>
  </psk:JobCopiesAllDocuments>

<!-- media-default, media-supported, media-col-database -->
  <psk:PageMediaSize psf2:psftype="Feature">
    <psk:JapanHagakiPostcard psf2:psftype="Option" psf2:default="false">
        <psk:MediaSizeWidth xsi:type="xsd:integer" psf2:psftype="ScoredProperty">100000</psk:MediaSizeWidth>
        <psk:MediaSizeHeight xsi:type="xsd:integer" psf2:psftype="ScoredProperty">148000</psk:MediaSizeHeight>
        <psk12:PortraitImageableSize xsi:type="psf2:ImageableAreaType" psf2:psftype="Property">3400,5000,93200,138000</psk12:PortraitImageableSize>
        <psk12:BorderlessImageableSize xsi:type="psf2:ImageableAreaType" psf2:psftype="Property">0,0,100000,148000</psk12:BorderlessImageableSize>
    </psk:JapanHagakiPostcard>
    <psk:ISOA5 psf2:psftype="Option" psf2:default="false">
        <psk:MediaSizeWidth xsi:type="xsd:integer" psf2:psftype="ScoredProperty">148000</psk:MediaSizeWidth>
        <psk:MediaSizeHeight xsi:type="xsd:integer" psf2:psftype="ScoredProperty">210000</psk:MediaSizeHeight>
        <psk12:PortraitImageableSize xsi:type="psf2:ImageableAreaType" psf2:psftype="Property">3400,5000,141200,200000</psk12:PortraitImageableSize>
        <psk12:BorderlessImageableSize xsi:type="psf2:ImageableAreaType" psf2:psftype="Property">0,0,148000,210000</psk12:BorderlessImageableSize>
    </psk:ISOA5>
    <psk:ISOA4 psf2:psftype="Option" psf2:default="false">
        <psk:MediaSizeWidth xsi:type="xsd:integer" psf2:psftype="ScoredProperty">210000</psk:MediaSizeWidth>
        <psk:MediaSizeHeight xsi:type="xsd:integer" psf2:psftype="ScoredProperty">297000</psk:MediaSizeHeight>
        <psk12:PortraitImageableSize xsi:type="psf2:ImageableAreaType" psf2:psftype="Property">3400,5000,203200,287000</psk12:PortraitImageableSize>
        <psk12:BorderlessImageableSize xsi:type="psf2:ImageableAreaType" psf2:psftype="Property">0,0,210000,297000</psk12:BorderlessImageableSize>
    </psk:ISOA4>
    <psk:NorthAmericaLetter psf2:psftype="Option" psf2:default="true">
        <psk:MediaSizeWidth xsi:type="xsd:integer" psf2:psftype="ScoredProperty">215900</psk:MediaSizeWidth>
        <psk:MediaSizeHeight xsi:type="xsd:integer" psf2:psftype="ScoredProperty">279400</psk:MediaSizeHeight>
        <psk12:PortraitImageableSize xsi:type="psf2:ImageableAreaType" psf2:psftype="Property">6400,5000,203200,269400</psk12:PortraitImageableSize>
        <psk12:BorderlessImageableSize xsi:type="psf2:ImageableAreaType" psf2:psftype="Property">0,0,215900,279400</psk12:BorderlessImageableSize>
    </psk:NorthAmericaLetter>
    <psk:JapanYou4Envelope psf2:psftype="Option" psf2:default="false">
        <psk:MediaSizeWidth xsi:type="xsd:integer" psf2:psftype="ScoredProperty">105000</psk:MediaSizeWidth>
```

```xml
            <psk:MediaSizeHeight xsi:type="xsd:integer" psf2:psftype="ScoredProperty">235000</psk:MediaSizeHeight>
            <psk12:PortraitImageableSize xsi:type="psf2:ImageableAreaType" psf2:psftype="Property">5600,8000,93800,214300</psk12:PortraitImageableSize>
            <psk12:BorderlessImageableSize xsi:type="psf2:ImageableAreaType" psf2:psftype="Property">0,0,105000,235000</psk12:BorderlessImageableSize>
        </psk:JapanYou4Envelope>
        <psk:NorthAmericaLegal psf2:psftype="Option" psf2:default="false">
            <psk:MediaSizeWidth xsi:type="xsd:integer" psf2:psftype="ScoredProperty">215900</psk:MediaSizeWidth>
            <psk:MediaSizeHeight xsi:type="xsd:integer" psf2:psftype="ScoredProperty">355600</psk:MediaSizeHeight>
            <psk12:PortraitImageableSize xsi:type="psf2:ImageableAreaType" psf2:psftype="Property">6400,5000,203200,345600</psk12:PortraitImageableSize>
            <psk12:BorderlessImageableSize xsi:type="psf2:ImageableAreaType" psf2:psftype="Property">0,0,215900,355600</psk12:BorderlessImageableSize>
        </psk:NorthAmericaLegal>
        <psk:JISB5 psf2:psftype="Option" psf2:default="false">
            <psk:MediaSizeWidth xsi:type="xsd:integer" psf2:psftype="ScoredProperty">182000</psk:MediaSizeWidth>
            <psk:MediaSizeHeight xsi:type="xsd:integer" psf2:psftype="ScoredProperty">257000</psk:MediaSizeHeight>
            <psk12:PortraitImageableSize xsi:type="psf2:ImageableAreaType" psf2:psftype="Property">3400,5000,175200,247000</psk12:PortraitImageableSize>
            <psk12:BorderlessImageableSize xsi:type="psf2:ImageableAreaType" psf2:psftype="Property">0,0,182000,257000</psk12:BorderlessImageableSize>
        </psk:JISB5>
    </psk:PageMediaSize>

<!-- orientation-requested-default -->
    <psk:PageOrientation psf2:psftype="Feature">
        <psk:Portrait psf2:psftype="Option" psf2:default="true"/>
        <psk:Landscape psf2:psftype="Option" psf2:default="false"/>
        <psk:ReverseLandscape psf2:psftype="Option" psf2:default="false"/>
    </psk:PageOrientation>

........................

<!-- finishings-default, finishings-supported -->
    <psk:JobStapleAllDocuments psf2:psftype="Feature">
        <psk:None psf2:psftype="Option" psf2:default="true"/>
        <psk:StapleTopLeft psf2:psftype="Option" psf2:default="false"/>
        <psk:StapleTopRight psf2:psftype="Option" psf2:default="false"/>
        <psk:StapleBottomLeft psf2:psftype="Option" psf2:default="false"/>
        <psk:StapleBottomRight psf2:psftype="Option" psf2:default="false"/>
        <psk:StapleDualLeft psf2:psftype="Option" psf2:default="false"/>
        <psk:StapleDualTop psf2:psftype="Option" psf2:default="false"/>
        <psk:StapleDualRight psf2:psftype="Option" psf2:default="false"/>
        <psk:StapleDualBottom psf2:psftype="Option" psf2:default="false"/>
        <psk:SaddleStitch psf2:psftype="Option" psf2:default="false"/>
    </psk:JobStapleAllDocuments>

<!-- sides-default, sides-supported -->
    <psk:JobDuplexAllDocumentsContiguously psf2:psftype="Feature">
        <psk:OneSided psf2:psftype="Option" psf2:default="true"/>
        <psk:TwoSidedShortEdge psf2:psftype="Option" psf2:default="false"/>
        <psk:TwoSidedLongEdge psf2:psftype="Option" psf2:default="false"/>
    </psk:JobDuplexAllDocumentsContiguously>

<!-- print-color-mode-default, print-color-mode-supported, pwg-raster-document-type-supported -->
    <psk:PageOutputColor psf2:psftype="Feature">
        <psk:Color psf2:psftype="Option" psf2:default="true"/>
        <psk:Grayscale psf2:psftype="Option" psf2:default="false"/>
        <psk:Monochrome psf2:psftype="Option" psf2:default="false"/>
    </psk:PageOutputColor>
</PrintDeviceCapabilities>
```

FIG.7

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_devoce001"
```

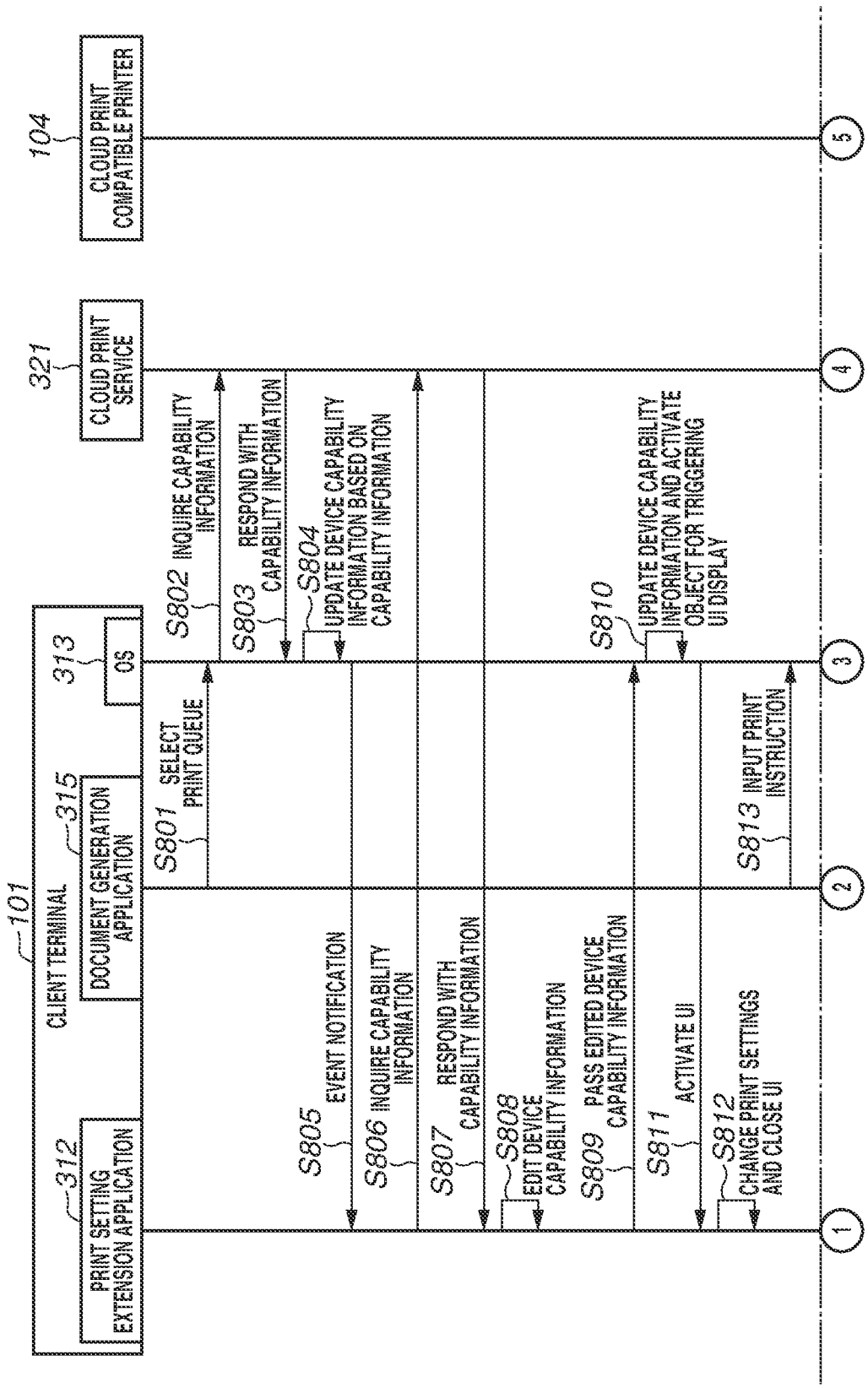

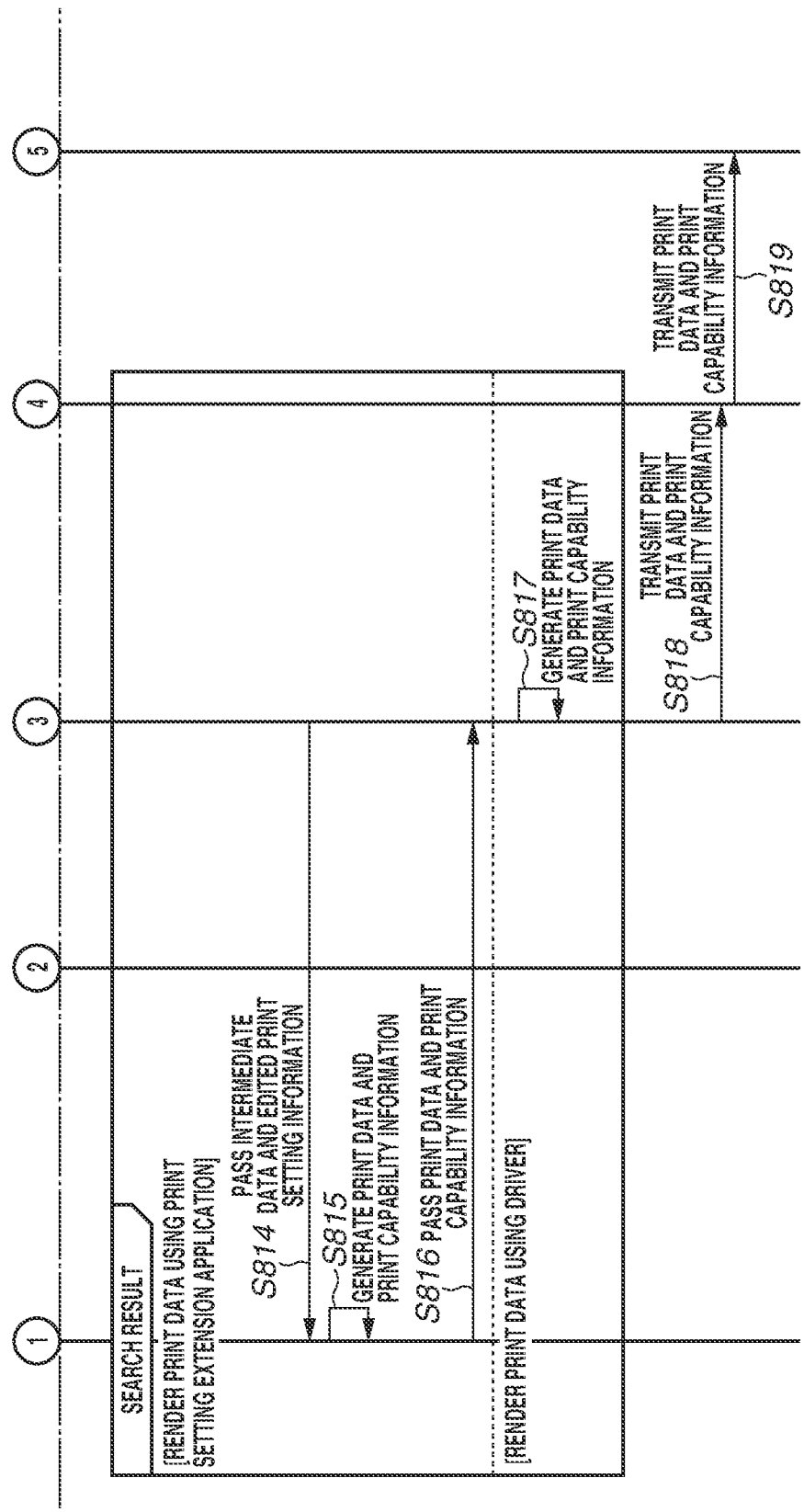

FIG.9A

Orientation
[Portrait ▼]

Two-sided printing
[OFF ▼]

Page order
[Normal ▼]

Print quality
[Standard ▼]

[Detailed settings] *901*

[OK] [Cancel] [Apply]
*905* *904* *903*

FIG.9B

Paper size
[A4 ▼]

Number of copies
[1]

Color print mode
[Color ▼]

Paper type
[Standard ▼]

[OK] [Cancel]
*902*

FIG.9C

Borderless printing
[OFF ▼]

Resolution
[300 dpi ▼]

Scaling
[OFF ▼]

Staple
[OFF ▼]

[OK] [Cancel]

FIG.9D

Fold
[OFF ▼]

Punch
[OFF ▼]

Discharge port
[Auto ▼]

Nup
[2 ▼]

[OK] [Cancel]

FIG.10A

Output paper size: A4 *(1001)*
Paper type: Plain paper
Number of copies: 1
Orientation: ● Portrait ○ Landscape
Print quality: Standard

*1002* — OK | Cancel

FIG.10B

Collate: OFF
Staple: Top left
Punch: OFF
Fold: OFF
Color mode: Color

OK | Cancel

FIG.10C

Page layout: 2in1
Layout order: Left to right
Magnification: OFF
Two-sided printing: One-sided
Binding location: Long edge OK | Cancel

FIG.10D

Rotate 180°: OFF
Store job in printer: OFF
Shorten job name: OFF

OK | Cancel

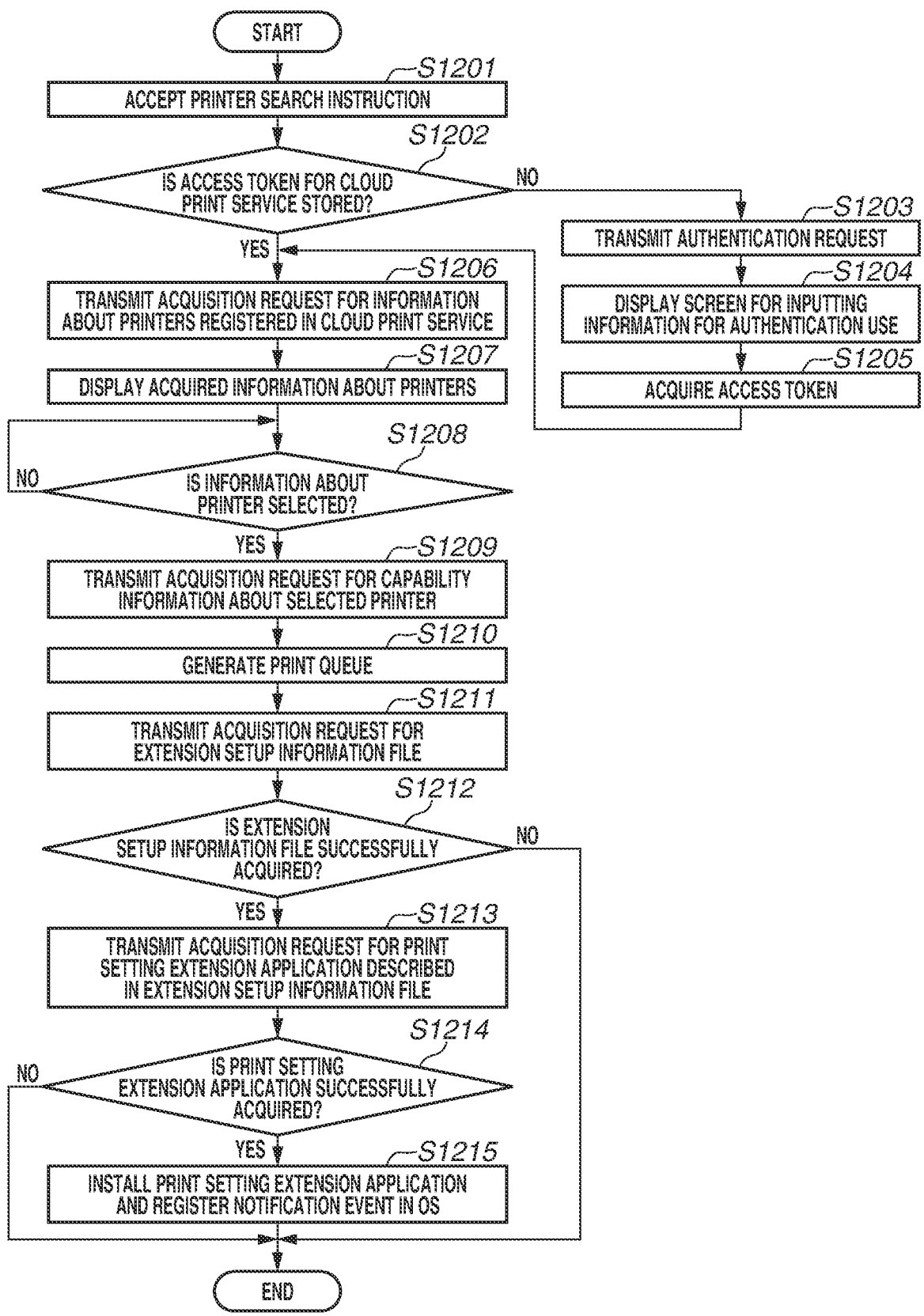

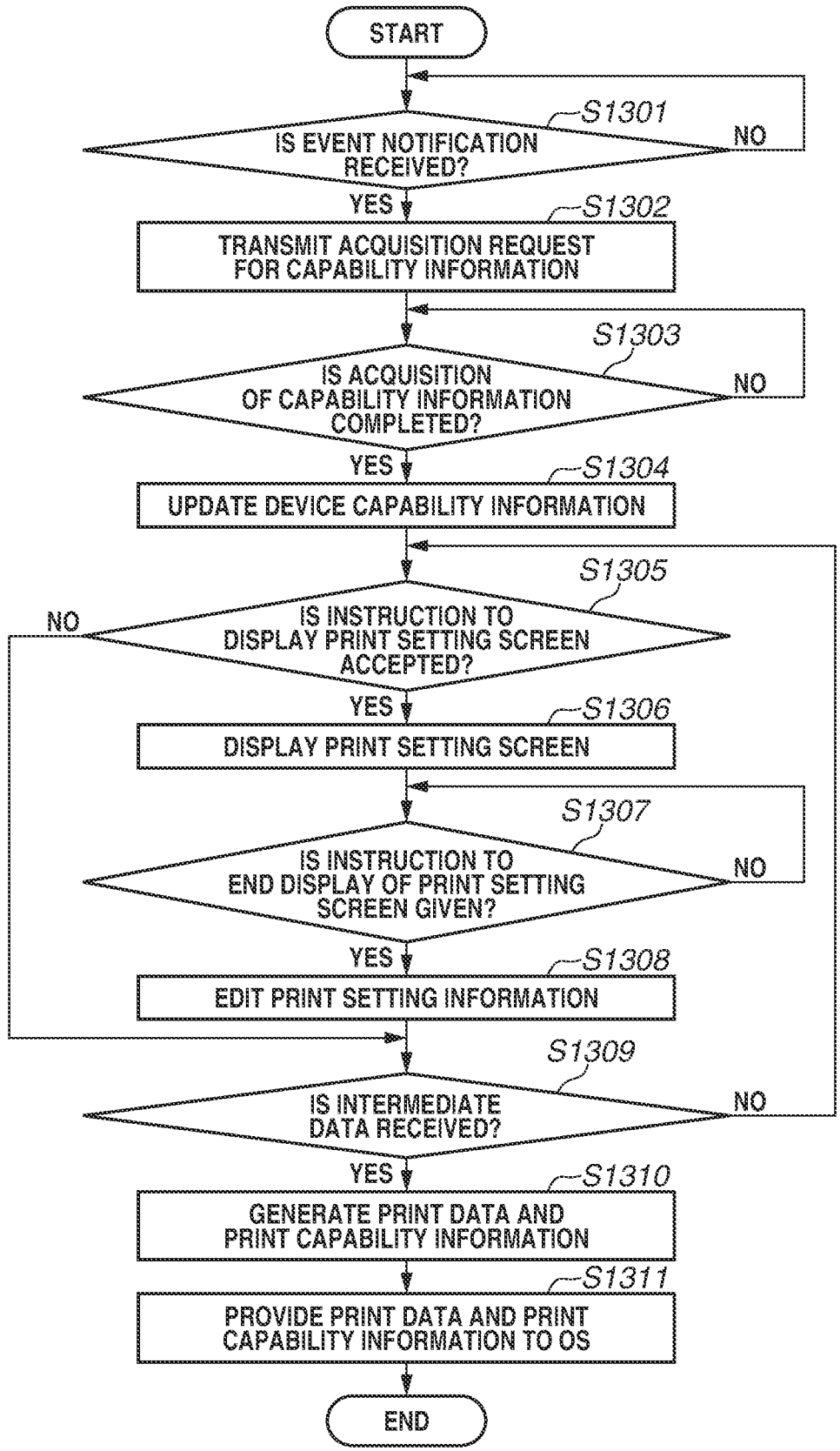

INFORMATION PROCESSING APPARATUS, CONTROL METHOD OF INFORMATION PROCESSING APPARATUS, AND STORAGE MEDIUM FOR ACQUIRING CAPABILITY INFORMATION ABOUT A PRINTER

BACKGROUND OF THE INVENTION

Field of the Invention

The present invention relates to an information processing apparatus, a control method of an information processing apparatus, and a storage medium.

Description of the Related Art

General-purpose printer drivers using an industry standard protocol, such as the Internet Printing Protocol (IPP), have been discussed in recent years. Examples of the general-purpose printer drivers include local printer drivers directly connected to printers and cloud printer drivers that transmit print data to cloud print services.

A general-purpose printer driver can communicate with printers of more than one printer vendor. By using a general-purpose printer driver, a user can thus transmit print data to image forming apparatuses and cloud print services without installing vendor-specific printer drivers.

Since such general-purpose printer drivers handle print jobs to be printed by printers of various vendors, the items and functions settable as print settings are limited. In view of this, Japanese Patent Application Laid-Open No. 2021-124791 discusses extending a print queue linked with a printer driver using identification information about a printer linked with the printer driver. A vendor-specific print setting user interface (UI) and print job edit functions can thereby be implemented.

SUMMARY OF THE INVENTION

According to an aspect of the present invention, an information processing apparatus includes an acquisition unit configured to acquire capability information about a printer configured to receive print data generated by a predetermined printer driver, and a display unit configured to display an object configured to accept a print setting based on the capability information acquired by the acquisition unit, wherein the acquisition unit is configured to acquire second capability information based on a predetermined user operation accepted after completion of acquisition of first capability information of the capability information.

Further features of the present invention will become apparent from the following description of embodiments with reference to the attached drawings.

BRIEF DESCRIPTION OF THE DRAWINGS

FIGS. 3A and 3B are diagrams illustrating an example of a sequence of processing for installing a print setting extension application according to the present embodiment.

FIG. 4 is a diagram illustrating an example of a screen displayed on a client terminal according to the present embodiment.

FIG. 5 is a diagram illustrating an example of configuration information stored in a cloud print compatible printer according to the present embodiment.

FIG. 6A is a diagram illustrating an example of device configuration information bundled with an operating system (OS) according to the present embodiment.

FIGS. 6B-1 and 6B-2 are diagrams illustrating an example of device configuration information extended with information acquired from a cloud print service according to the present embodiment.

FIG. 7 is a diagram illustrating an example of an extension setup information file acquired from an online support service according to the present embodiment.

FIGS. 8A and 8B are diagrams illustrating an example of a sequence of processing from making of print settings by the print setting extension application to transmission of print data according to the present embodiment.

FIGS. 9A to 9D are diagrams illustrating examples of print setting screens displayed in a case where the print setting extension application is not installed according to the present embodiment.

FIGS. 10A to 10E are diagrams illustrating an example of a print setting screen displayed in a case where the print setting extension application is installed according to the present embodiment.

FIG. 12 is a flowchart illustrating processing for installing the print setting extension application on the client terminal according to the present embodiment.

FIG. 13 is a flowchart illustrating processing when the print setting extension application makes print settings and generates print data according to the present embodiment.

DESCRIPTION OF THE EMBODIMENTS

An embodiment of the present invention will be described below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
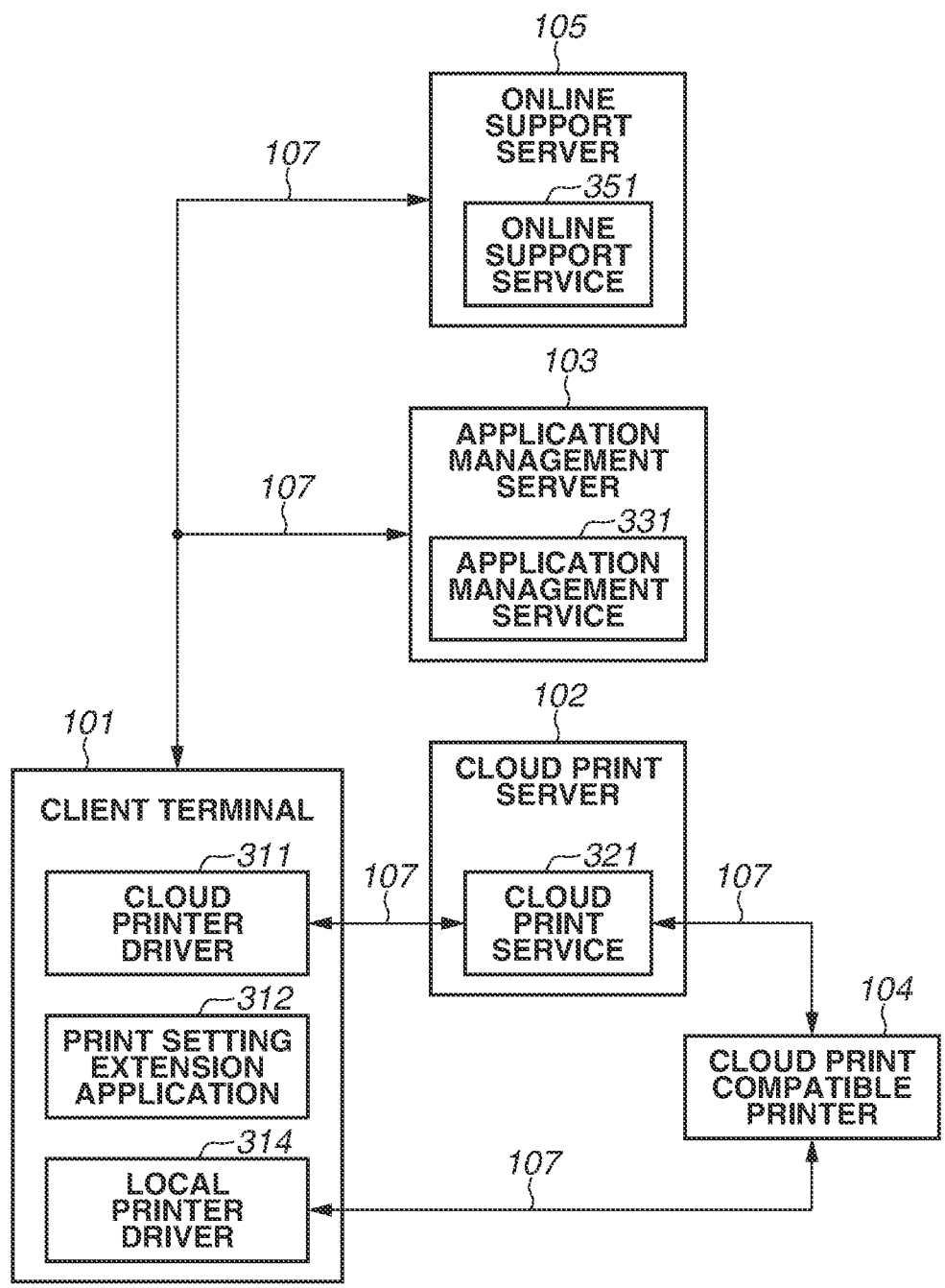
FIG. 1 is a block diagram illustrating an example of a printing system according to an embodiment.

FIG. 1 illustrates a configuration diagram of a cloud print-based printing system according to the present embodiment. A client terminal 101, a cloud print server 102, an application management server 103, a cloud print compatible printer 104, and an online support server 105 are connected via a network 107.

While FIG. 1 illustrates one client terminal 101 and one cloud print compatible printer 104, the printing system can include a plurality of client terminals 101 and a plurality of cloud print compatible printers 104.

The cloud print server 102, the application management server 103, and the online support server 105 each can be a server system including a plurality of information processing apparatuses. Configuring each server as a server system including a plurality of information processing apparatuses enables load distribution between the information processing apparatuses.

The cloud print server 102, the application management server 103, and the online support server 105 can be virtually configured in a single physical information processing apparatus.

The network 107 connecting to the cloud service is assumed to be a wide area network (WAN), such as the Internet, whereas the entire network 107 can be a closed environment, such as a corporate local area network (LAN).

The client terminal 101 is an information processing apparatus, such as a personal computer (PC), a tablet, and a smartphone. The client terminal 101 is a terminal directly operated by the user. Any application software can be run on the client terminal 101.

The cloud print compatible printer 104 is a device that actually performs printing on a recording medium, such as a sheet. The cloud print compatible printer 104 is an image forming apparatus for converting print data received via the network 107 into image data and printing the image data.

The cloud print compatible printer 104 can receive print data from the client terminal 101 via the cloud print server 102 or directly receive print data from the client terminal 101 without the intervention of the cloud print server 102.

The cloud print compatible printer 104 receives print data generated by a cloud printer driver 311 of the client terminal 101 via the cloud print server 102. The cloud print compatible printer 104 also receives print data generated by a local printer driver 314 on the client terminal 101 without the intervention of the cloud print server 102.

The cloud print server 102 accepts print instructions and print data from outside. The cloud print server 102 transmits the received print data to a predetermined cloud print compatible printer 104.

The application management server 103 stores and manages various applications.

The application management server 103 receives identification information about an application and a download request from the client terminal 101, and transmits the application identified based on the received identification information to the client terminal 101.

The online support server 105 is a server apparatus for providing an online support service 351. The online support service 351 is a service for providing the client terminal 101 with an extension setup information file describing information for extending the functions of the client terminal 101.

A hardware configuration of the printing system according to the present embodiment will now be described with reference to FIGS. 2A to 2E.

Figure 2B:
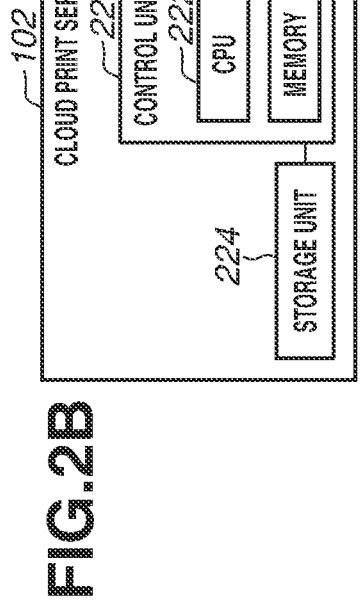
FIGS. 2A to 2E are block diagrams illustrating examples of hardware configuration of information processing apparatuses and an image forming apparatus according to the present embodiment.
Figure 2D:
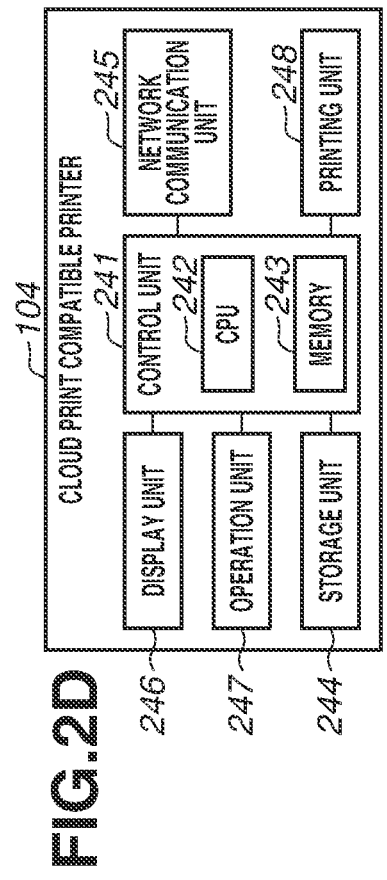
Figure 2A:
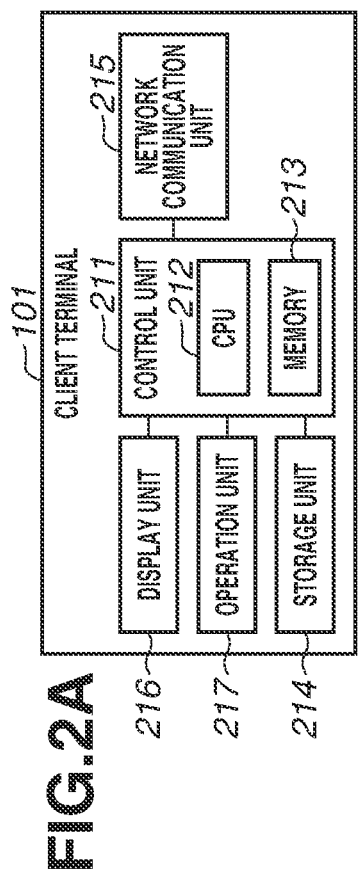

FIG. 2A is a block diagram illustrating a hardware configuration of the client terminal 101.

The client terminal 101 includes a display unit 216, an operation unit 217, a storage unit 214, a control unit 211, and a network communication unit 215.

The storage unit 214 refers to a nonvolatile storage device, such as a hard disk drive (HDD) and a solid-state drive (SSD). The storage unit 214 is capable of storing and rewriting digital data.

The control unit 211 includes a central processing unit (CPU) 212 and a memory 213, and controls the entire operation of the client terminal 101. The CPU 212 loads programs stored in the storage unit 214 into the memory 213, and executes the loaded programs. The memory 213 is a main storage memory for the CPU 212, and used as a work area or a temporary storage area for loading various programs.

The network communication unit 215 is a device for communicating with the external network 107. The network communication unit 215 inputs and outputs digital data from/to external servers and client terminals via the network 107.

The display unit 216 is a device, such as a liquid crystal display, for displaying visual information to the user. The operation unit 217 is a device for accepting the user's input using a keyboard or a mouse. The operation unit 217 can also be a device, such as a touchscreen, having the functions of both the display unit 216 and the operation unit 217.

FIG. 2B is a block diagram illustrating a hardware configuration of the cloud print server 102. The cloud print server 102 includes a storage unit 224, a control unit 221, and a network communication unit 225.

The storage unit 224, the control unit 221, and the network communication unit 225 are similar to those of the client terminal 101, and a description thereof will thus be omitted.

While the cloud print server 102 is described to be constituted by a single information processing apparatus having the hardware configuration illustrated in FIG. 2B, the cloud print server 102 can also be constituted by a plurality of information processing apparatuses having the hardware configuration illustrated in FIG. 2B.

Figure 2C:
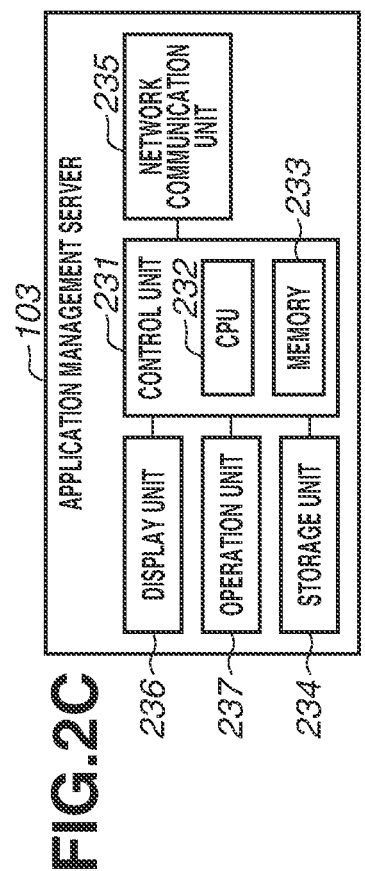

FIG. 2C is a block diagram illustrating a hardware configuration of the application management server 103. The application management server 103 includes a display unit 236, an operation unit 237, a storage unit 234, a control unit 231, and a network communication unit 235.

The display unit 236, the operation unit 237, the storage unit 234, the control unit 231, and the network communication unit 235 are similar to those of the client terminal 101, and a description thereof will thus be omitted.

While the application management server 103 is described to be constituted by a single information processing apparatus having the hardware configuration illustrated in FIG. 2C, the application management server 103 can be constituted by a plurality of information processing apparatuses.

FIG. 2D is a block diagram illustrating a hardware configuration of the cloud print compatible printer 104. The cloud print compatible printer 104 includes a display unit 246, an operation unit 247, a storage unit 244, a control unit 241, a network communication unit 245, and a printing unit 248.

The display unit 246 is built in the cloud print compatible printer 104, and is a device, such as a touchscreen and a light-emitting diode (LED), for displaying information to the user.

The operation unit 247 is a device for accepting the user's input. The operation unit 247 can include hardware keys, such as a numerical keypad, aside from a touchscreen. The storage unit 244 and the control unit 241 are similar to those of the client terminal 101, and a description thereof will thus be omitted.

The network communication unit 245 is a device for communicating with the external network 107. The network communication unit 245 mainly has the role of receiving print data and transmitting an error and other states of the cloud print compatible printer 104 to the external servers.

The printing unit 248 is a device that performs print processing by performing a series of operations including a sheet feed, printing, and sheet discharge operations on sheets prepared in a cassette or on a tray. The printing method is not limited to an electrophotographic or inject method in particular. A two-sided unit and finishing devices for stapling and punching to be used in discharging sheets are also included in the printing unit 248.

While in the present embodiment a single-function printer that performs only a print function is described as an example of the cloud print compatible printer 104, a multifunction printer (multifunction peripheral [MFP]) having a scanner function and a facsimile (FAX) function as well can be used.

Figure 2E:
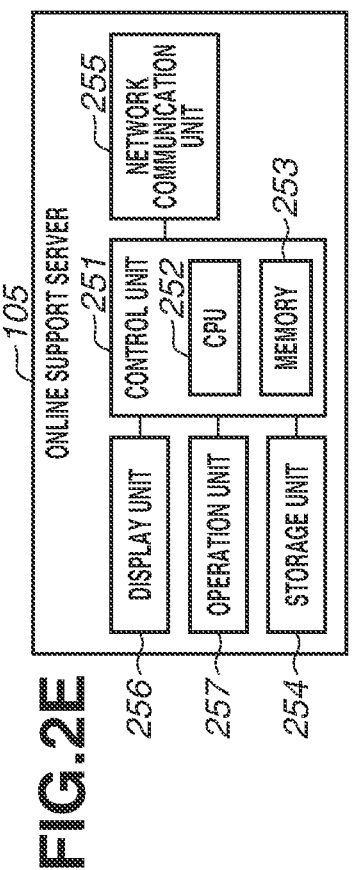

FIG. 2E is a hardware block diagram illustrating details of the online support server 105. While in the present embodiment the online support server 105 is described to be constituted by a single information processing apparatus, the online support server 105 can be constituted by a plurality of information processing apparatuses. The online support server 105 includes a display unit 256, an operation unit 257, a storage unit 254, a control unit 251, and a network communication unit 255. The display unit 256 and the operation unit 257 are similar to the display unit 216 and the operation unit 217 of the client terminal 101, and a description thereof will thus be omitted. The storage unit 254 is a memory device, such as an HDD and an SSD. The storage unit 254 stores extension setup information files that are files describing information for extending the functions to be provided by the client terminal 101.

The control unit 251 includes a CPU 252 and a memory 253. The CPU 252 controls the entirety of the online support server 105. The memory 253 is used for processing performed by the CPU 252. The network communication unit 255 is an interface for the online support server 105 to communicate with the client terminal 101. The online support server 105 receives an acquisition request for a file stored in the storage unit 254 and transmits the corresponding file to the client terminal 101 via the network communication unit 255.

An example of the user's procedure and a sequence between pieces of software and a cloud print service according to the present embodiment will now be described with reference to FIGS. 3A and 3B.

The cloud print compatible printer 104 initially accepts a printer registration operation for registering the cloud print compatible printer 104 in a cloud print service 321 from the user. In step S3001, the cloud print compatible printer 104 transmits a printer registration request along with device identification information about the cloud print compatible printer 104, to the cloud print service 321. An example of the device identification information transmitted to the cloud print service 321 here is a hardware identifier (ID), or HWID, assigned to each printer model. The device identification information can be any information from which the printer model can be identified.

Receiving the printer registration request, the cloud print service 321 transmits a Uniform Resource Locator (URL) of the cloud print service 321 for printer registration to the cloud print compatible printer 104. The user accesses the URL from the cloud print compatible printer 104 or an information processing apparatus, and an input screen for inputting a user ID and a password is displayed on the display unit of the terminal accessing the URL. The user inputs the user ID and password for using the cloud print service 321, and logs in to the cloud print service 321. If the user logs in successfully, the cloud print service 321 transmits an acquisition request for information to be used for printer registration to the cloud print compatible printer 104. The cloud print compatible printer 104 transmits printer information to the cloud print service 321 in response to the request.

The cloud print service 321 receiving the printer registration request then registers the information about the cloud print compatible printer 104, and generates a print queue for the cloud print compatible printer 104. Here, the cloud print service 321 acquires capability information about the cloud print compatible printer 104, and links the capability information with the generated print queue. The capability information refers to information describing the functions of the cloud print compatible printer 104, or equivalently, information for the user to make print settings during printing. Examples include two-sided capability information, color capability information, and stapling capability information.

FIG. 5 is a diagram illustrating an example of the capability information. The capability information includes item names and attribute values. The item names correspond to setting items of print settings. The attribute values correspond to setting values, options, or value ranges that can be set for the respective setting items. In addition to the item names and attribute values defined as industry standard specifications by the Internet Printing Protocol (IPP), the cloud print compatible printer 104 also stores item names and attribute values independently defined by the printer vendor. For example, item names "Store job in printer", "Shorten job name", and "Staple-free stapling" among the item names illustrated in FIG. 5, and the accompanying attribute values, are ones independently defined by the printer vendor. "Store job in printer" is a setting item for setting whether the cloud print compatible printer 104 stores print data received from the cloud print service 321 even after printing. "Shorten job name" is an item for setting whether to shorten the name given to the print data received from the cloud print service 321 and display the shortened name when the cloud print compatible printer 104 displays bibliographic information about the print data on its display unit 246. "Staple-free stapling" is an item for setting whether the cloud print compatible printer 104 binds output sheets based on the print data received from the cloud print service 321 without using staples. Binding without using staples refers to, for example, binding the sheets by compression. Printer vendor-specific attribute values can be defined as attribute values corresponding to an item name defined as the industry standard specifications. For example, "Fold" is an item name defined by the IPP. An attribute value "Saddle fold" of "Fold" is an attribute value independently defined by the printer vendor, referring to a function of folding two or more sheets together and discharging the folded sheets without stapling the sheets.

In the present embodiment, it is assumed that the capability information is transmitted to the cloud print service 321 according to the communication protocol IPP. The cloud print compatible printer 104 registers the capability information using a command prepared for the cloud print compatible printer 104 to register capability information in the cloud print service 321. The cloud print compatible printer 104 notifies the cloud print service 321 of the item names illustrated in FIG. 5 and the attribute values and default values corresponding to the respective item names. The capability information here is notified regardless of whether the items and attribute values are defined by the IPP. For example, the item names "Store job in printer", "Shorten job name", and "Staple-free stapling" illustrated in FIG. 5 and the attribute values thereof are also notified to the cloud print service 321. "Saddle fold", which is one of the attribute values of "Fold" and a printer vendor-specific attribute value, is also registered in the cloud print service 321 as one of the attribute values of "Fold".

Installation of a print setting extension application 312 will now be described. The print setting extension application 312 is installed when the user makes a setup operation to perform printing using the cloud print compatible printer 104 on the client terminal 101. In registering the cloud print compatible printer 104 in the client terminal 101, a standard print function that is one of the functions of an operating system (OS) 313 of the client terminal 101 is used.

In step S3002, the OS 313 of the client terminal 101 accepts a printer addition operation that is the user's setup operation for the cloud print compatible printer 104. An example of the setup operation for the cloud print compatible printer 104 will be described. FIG. 4 illustrates a screen related to printers registered in the client terminal 101, displayed by the OS 313 of the client terminal 101. The user selects an object 401 to input a printer search instruction to the OS 313.

Accepting the printer search instruction, the OS 313 determines whether there is an access token for the cloud print service 321. If the OS 313 does not have the access token, the OS 313 displays a not-illustrated screen for inputting user information (login name and password). In step S3003, the OS 313 of the client terminal 101 transmits the user information input via the screen to the cloud print service 321, and requests user authentication and an access token.

In step S3004, the cloud print service 321 performs authentication processing using the user information received from the client terminal 101. When the authentication processing is completed, the cloud print service 321 notifies the client terminal 101 of the result of the authentication processing.

If the user authentication is successful, then in step S3005, the OS 313 of the client terminal 101 acquires the access token from the cloud print service 321.

If the user authentication in step S3004 fails, then in step S3006, the cloud print service 321 notifies the OS 313 of the client terminal 101 of the authentication error. In step S3007, the OS 313 of the client terminal 101 aborts the processing based on the received information about the authentication error. If the access token fails to be acquired, the OS 313 of the client terminal 101 ends the processing illustrated in FIGS. 3A and 3B.

If the OS 313 has the access token or the access token is acquired in step S3005, the processing proceeds to step S3008. The OS 313 searches for printers registered in the cloud print service 321 and printers connected to the network 107.

In step S3008, the OS 313 of the client terminal 101 transmits an acquisition request for printer information registered in the cloud print service 321 to search for printers. In step S3008, the OS 313 of the client terminal 101 transmits the acquisition request for printer information with the access token attached to the cloud print service 321.

In step S3009, the cloud print service 321 transmits information (printer information) about printers that the user identified by the access token attached to the acquisition request is permitted to use to the client terminal 101. The printer information transmitted to the client terminal 101 in step S3009 includes the printer names given to the printers registered in the cloud print service 321 and the HWIDs of the printers.

The OS 313 of the client terminal 101 acquires a printer list transmitted from the cloud print service 321 and device identification information about each printer. In parallel with the processing in steps S3008 and S3009, the OS 313 of the client terminal 101 searches for printers connected to the same network 107 as is the client terminal 101. This device search is performed using a protocol, such as multicast Domain Name System (mDNS) and Bonjour.

The OS 313 displays a printer list on the client terminal 101 based on the printer information acquired from the cloud print service 321 and the printer information detected by the search of the network 107. An area 402 illustrated in FIG. 4 lists the printer information received from the cloud print service 321. Of the pieces of printer information displayed in the area 402, "Cloud Printer 001/002/003" is the information about the printers registered in the cloud print service 321. "Printer XX" represents a printer detected by the client terminal 101 searching the network 107. The printer information acquired from the cloud print service 321 and the printer information detected by searching the network 107 are thus displayed in a list form. The printer information received from the cloud print service 321 is displayed with icons 403. The printer information detected by searching the network 107 is displayed with an icon 404. The printer information received from the cloud print service 321 and the printer information detected by searching the network 107 can thus be distinguished in display. Alternatively, the client terminal 101 can display only the information about the printers registered in the cloud print service 321.

Next, the user selects printer information corresponding to the printer that the user wants to register in the client terminal 101 from the printer information displayed in the area 402.

In step S3010, the OS 313 of the client terminal 101 inquires the capability information about the printer corresponding to the selected printer information from the cloud print service 321. Which setting items of the capability information for the OS 313 of the client terminal 101 to inquire is determined by the specifications of the OS 313 and set in the OS 313. The OS 313 of the client terminal 101 specifies the setting items set in advance and inquires the capability information. The setting items set in the OS 313 in advance are ones defined as standard specifications by the IPP. Examples of the setting items include "paper size", "paper type", and "color mode".

In step S3011, the cloud print service 321 responds to the OS 313 of the client terminal 101 with the capability information about the cloud print compatible printer 104.

In the present embodiment, the information registered in the cloud print service 321 during registration in step S3001 will be described to be transmitted to the client terminal 101 in step S3011. However, capability information registered in the cloud print service 321 at timing other than the foregoing can be transmitted to the client terminal 101. For example, capability information registered in the cloud print service 321 in modifying the capability information about the cloud print compatible printer 104 can be transferred to the client terminal 101. The user can also issue an instruction to update the capability information from a user interface provided by the cloud print service 321, and the capability information updated based on the instruction can be transmitted to the client terminal 101. The cloud print service 321 can acquire capability information from the cloud print compatible printer 104 at the timing of step S3010, and notify the client terminal 101 of the acquired capability information.

In step S3011, the cloud print service 321 returns the attribute values and default values corresponding to the setting items specified by the client terminal 101. The attribute values to be returned here are all the attribute values registered in the cloud print service 321 regardless of whether the attribute values are ones defined as a standard. The default values are values to be initially set when the client terminal 101 displays a print setting screen. If none of the attribute values and default values corresponding to the setting items inquired by the OS 313 of the client terminal 101 is stored, the cloud print service 321 does not respond to the OS 313.

The OS 313 then starts to install the cloud printer driver 311 based on the device identification information about the printer selected by the user and the printer name of the printer.

In step S3012, the OS 313 generates a print queue of the cloud printer driver 311 having basic device capability information bundled with the OS 313. Device capability information refers to definition information for generating print setting capability information about a printer driver. An example of the device capability information is PrintDeviceCapabilities described in Extensible Markup Language (XML). FIG. 6A is a diagram illustrating an example of the device capability information in an initial state, bundled with the OS 313. For example, "Feature" indicates that "PageMediaSize" describing a paper size is a setting item. "Option" represents an option corresponding to "PageMediaSize". As illustrated in FIG. 6A, the initial values of the device capability information include only two options "A4" and "Letter" for the paper size. Such information is linked with the print queue and stored in generating the print queue, and managed by the OS 313. The device capability information in the initial state is fixed device capability information regardless of the information about the connected printer.

The OS 313 then updates the device capability information constituting the cloud printer driver 311 using the capability information acquired from the cloud print service 321. FIGS. 6B-1 and 6B-2 are diagrams illustrating an example of the device capability information updated using the capability information acquired from the cloud print service 321. For example, "Option" values other than "A4" and "Letter" are added to the "PageMediaSize" describing paper sizes as paper sizes printable by the cloud print compatible printer 104. In such a manner, the client terminal 101 initially registers the cloud printer driver 311 and the device capability information bundled with the OS 313 in the print queue in association with each other. The client terminal 101 then updates the device capability information linked with the print queue with the capability information acquired from the cloud print service 321. Here, the OS 313 updates the device capability information using only the attribute values defined as the industry standard specifications in the capability information acquired from the cloud print service 321. If, for example, even vendor-specific attribute values about the paper type are acquired, the vendor-specific attribute values are therefore not added to the device capability information.

Print setting values not settable by using the device capability information bundled with the OS 313 can thus be set.

In such a manner, the installation of the cloud printer driver 311 is completed. The processing so far enables transmission of print data from the client terminal 101 to the print queue for the cloud print compatible printer 104 generated on the cloud print service 321.

Next, the OS 313 starts processing for installing an application that is linked with the cloud print compatible printer 104 and extends the cloud printer driver 311.

The OS 313 then performs identification additional information addition processing on the device identification information. The identification additional information addition processing is processing for acquiring an extension setup information file 700 from the online support server 105. Identification additional information can be any character string different from normal device identification information. In the present embodiment, for the sake of distinction from other device applications, the OS 313 adds identification additional information ("PrinterApp_") indicating a printer-related application to the device identification information. "PrinterApp_" is just an example, and can be other character strings, numerals, and symbols. If the device identification information about the cloud print compatible printer 104 is, for example, device001, the device identification information resulting from the identification additional information addition processing is PrinterApp_device001.

In step S3013, the OS 313 transmits, to the online support service 351, a search request for the extension setup information file 700 including the device identification information to which the intended identification additional information is added. In step S3013, the online support service 351 is notified of the device identification information to which the identification additional information is added, or "PrinterApp_device001".

The online support service 351 stores an extension setup information file illustrated in FIG. 7. FIG. 7 illustrates an example of the extension setup information file 700. The extension setup information file 700 is a file generated by the vendor of the cloud print compatible printer 104 and registered in the online support service 351.

The extension setup information file 700 describes an application ID for identifying the print setting extension application 312 to be used in setting print data to be transmitted to the cloud print compatible printer 104. In the extension setup information file 700 illustrated in FIG. 7, an item "PackageFamilyName" is the identification information about the print setting extension application 312. "PrinterHardwareId" describes the character string of the identification information about the cloud print compatible printer 104 to which the identification additional information is added.

Aside from the extension setup information file 700 describing the identification information about the print setting extension application 312, the online support service 351 stores an extension setup information file describing identification information about the cloud printer driver 311. The extension setup information file describing the identification information about the cloud printer driver 311 describes the ID of the cloud printer driver 311 in "PackageFamilyName". "PrinterHardwareId" of the extension setup information file describes the device identification information without the identification additional information.

As described above, the online support service 351 stores both the extension setup information file describing the ID of the cloud printer driver 311 and the extension setup information file 700 describing the ID of the print setting extension application 312. The OS 313 thus adds the identification additional information to the device identification information to acquire the intended extension setup information file 700 as appropriate.

Receiving the search request, the online support service 351 searches for the extension setup information file 700 including the same "PackageFamilyName" as the identification additional information-added device identification information specified by the search request.

If, as a result of the search, the extension setup information file 700 including the intended device identification information is found to be stored in the online support service 351, then in step S3014, the online support service 351 returns the extension setup information file 700 to the OS 313. Here, the content of the extension setup information file 700 is written to the registry of the OS 313.

In step S3015, the OS 313 installs the extension setup information described in the extension setup information file 700 acquired from the online support service 351 so that the extension setup information is linked with the print queue generated in step S3012.

In step S3016, the OS 313 extracts an application ID from the installed extension setup information. The application ID refers to the ID defined by "PackageFamilyName" in the extension setup information file 700. The processing described so far is for the case where the extension setup information file 700 corresponding to the cloud print compatible printer 104 is stored in the online support service 351.

As a result of the search, the extension setup information file 700 including the intended device identification information may fail to be detected in the online support service 351. In such a case, in step S3017, the OS 313 completes the installation of the cloud printer driver 311 and aborts the application installation processing. The OS 313 performs the processing of step S3017 if the extension setup information file 700 is not received within a predetermined time from the search request in step S3013 or if an error notification is received from the online support service 351.

Step S3018 and the subsequent steps deal with processing for the case where the extension setup information file 700 is successfully acquired and the application ID is successfully extracted in step S3016.

In step S3018, the OS 313 requests the application management service 331 to search for an application having the same ID as the extracted application ID. The application management service 331 stores applications to be run on the client terminal 101 and the IDs of the applications, or application IDs, in association with each other. The applications and the application IDs are registered in the application management service 331 by the vendor providing the cloud print compatible printer 104.

If the print setting extension application 312 matching the requested application ID is stored in the application management service 331, then in step S3019, the application management service 331 returns the print setting extension application 312 to the client terminal 101. The print setting extension application 312 returned here is the application having the same ID as the transmitted application ID.

In step S3020, the OS 313 installs the acquired print setting extension application 312 in association with the client-side print queue. The OS 313 stores the application ID into the registry as information about the print queue. The print setting extension application 312 sets the OS 313 to issue an event notification at timing when the print queue linked with the print setting extension application 312 is set on a print setting screen. The installed print setting extension application 312 is activated after the client terminal 101 is powered on and the OS 313 is activated. The activated print setting extension application 312 then runs as a background task.

If the print setting extension application 312 matching the requested application ID is not stored in the application management service 331, then in step S3021, the OS 313 aborts the application installation processing. In such a case, the processing ends with the cloud printer driver 311 installed and linked with the generated print queue, and without the print setting extension application 312 being linked with the print queue.

In the foregoing description, the extension setup information file 700 is searched for by adding a predetermined character string to the device identification information about the cloud print compatible printer 104. However, the search can be performed without adding a predetermined character string, as long as printer driver installation files can be distinguished.

An example of the user's procedure and a sequence between pieces of software and the cloud print service 321 according to the present embodiment will now be described with reference to FIGS. 8A and 8B.

A document generation application 315 is an application, such as a document data generation application, a presentation material generation application, and a photograph and image data display application.

The document generation application 315 displays a print setting screen (FIG. 11) for selecting a print queue as a print setting initial screen. While, in the present embodiment, the document generation application 315 displays the print setting initial screen, the OS 313 can display a similar screen. The print setting initial screen displays an object 1101 for selecting a print queue, objects 1102 for making various print settings, and a print preview image 1103.

In step S801, the OS 313 selects the print queue linked with the printer set as a default printer. In the present embodiment, suppose that the cloud print compatible printer 104 is set as the default printer. The processing of step S801 and the subsequent steps is also performed when the user changes the printer to be used by operating the object 1101.

In step S802, the OS 313 inquires the capability information about the cloud print compatible printer 104 from the cloud-side print queue corresponding to the cloud print compatible printer 104 on the cloud print service 321. Which setting items of the capability information to inquire is determined by the specifications of the OS 313 in advance. The capability information inquired at this timing is therefore similar to that inquired in step S3010 of FIG. 3A. The inquiry is made to the cloud print compatible printer 104 using a standard protocol command defined by the IPP, such as Get-print-Attributes. If Get-print-Attributes is used, the OS 313 inquires the predetermined capability information in a list form.

In step S803, the cloud print service 321 responds to the OS 313 with the capability information about the cloud print compatible printer 104 based on the list of capability information transmitted using Get-print-Attributes. Suppose, for example, that the media size attribute is specified by Get-print-Attributes (IPP). If the media size attribute is stored, the cloud print service 321 responds with the values linked with the attribute (e.g., A4, B5, and Letter). If the print queue of the cloud print service 321 for the cloud print compatible printer 104 does not have the attribute specified by Get-print-Attributes, the cloud print service 321 does not respond with a linked value. The capability information to be acquired in step S803 is only that which is inquired by the OS 313 regardless of the type or capabilities of the connected printer.

The OS 313 updates the device capability information using the capability information acquired from the cloud print service 321. In step S804, the OS 313 adds the capability information acquired in step S803 of FIG. 8A to the device capability information generated in step S3012 of FIG. 3B. If the device capability information has been updated, the device capability information managed by the client terminal 101 can be updated by performing in step S804. In step S804, the device capability information is updated only in terms of the attribute values defined by the industry standard specifications.

In step S805, the OS 313 notifies the print setting extension application 312 of an event and an application programming interface (API) to be used in editing the device capability information. The notification timing of this even is registered when the print setting extension application 312 is installed on the OS 313 of the client terminal 101.

Receiving the event, the print setting extension application 312 issues a capability information acquisition request to the cloud print service 321. The capability information to be acquired here is that for writing setting items and attribute values independently defined by the printer vendor into the device capability information.

In step S806, the print setting extension application 312 receiving the event from the OS 313 inquires the capability information about the cloud print compatible printer 104 via the cloud print service 321. Here, the print setting extension application 312 inquires about capability information about setting items specific to the printer vendor and setting items including attribute values specific to the printer vendor, to the cloud print service 321. Like step S802 of FIG. 8A, the inquiry is made using Get-print-Attributes, and the capability information is acquired by specifying the item names of the setting items to be inquired as the item names. In the present embodiment, the capability information about the setting items independently defined by the printer vendor and the setting items including the attribute values independently defined by the printer vendor is described to be acquired in step S806. Alternatively, the capability information about the setting items already acquired by the acquisition of the capability information by the OS 313 can also be acquired again.

In step S807, the cloud print compatible printer 104 inquired about the printer vendor-specific capability information by the print setting extension application 312 responds to the print setting extension application 312 via the cloud print service 321. The cloud print service 321 here responds in a similar manner to in step S3011 of FIG. 3B described above. In the present embodiment, in step S807, the cloud print service 321 responds with the capability information about the cloud print compatible printer 104 stored in the cloud print service 321. Alternatively, the cloud print service 321 can acquire the capability information from the cloud print compatible printer 104 again in response to the request of step S806, and respond to the client terminal 101.

Acquiring the capability information from the cloud print compatible printer 104, the print setting extension application 312 edits the device capability information managed by the OS 313 via a configuration information object. The configuration information object is a set of data groups to be used in editing the device capability information. The print setting extension application 312 is unable to directly edit the device capability information retained by the OS 313. The print setting extension application 312 therefore modifies the device capability information retained by the OS 313 by using the configuration information object. In step S808, the print setting extension application 312 edits the device capability information by converting the capability information acquired in step S807 of FIG. 8A, such as "Staple-free stapling" and "Store job in printer", into device capability information and adding the converted device capability information to the configuration information object. By performing the processing up to step S808, the setting items and attribute values specific to the printer vendor are stored into the device capability information in addition to the capability information about the standard setting items acquired by the inquiry by the OS 313.

In step S809, the print setting extension application 312 passes the edited device capability information to the OS 313. The OS 313 links the device capability information acquired from the print setting extension application 312 with the print queue, and stores the device capability information.

In step S810, the OS 313 updates the device capability information, whereby an object for triggering display of a user interface (UI) of the print setting extension application 312 is activated. An example of the object for triggering the display of the UI of the print setting extension application 312 is an object 1104 illustrated in FIG. 11. Until the processing of step S810 is completed, the object 1104 is grayed out and a print setting screen of the print setting extension application 312 will not appear even if the object 1104 is clicked by the user. After the processing of step S810 is completed, the gray-out of the object 1104 is cancelled and the object 1104 becomes selectable by the user.

If the user selects the object 1104, then in step S811, the print setting extension application 312 is activated to display a print setting screen (UI) illustrated in FIGS. 10A to 10E. This print setting screen does not depend on the type of document generation application 315 in use.

If the print setting extension application 312 is not linked with the selected print queue, a default standard print setting screen of the OS 313 is displayed as illustrated in FIG. 9A. If a detailed setting button 901 on the standard print setting screen is pressed, a detailed print setting screen of FIG. 9B appears. The detailed print setting screen is intended to set setting items unable to be displayed within the standard print setting screen of FIG. 9A. The detailed print setting screen illustrated in FIG. 9B can be scrolled by operating the scrollbar, whereby print settings of a plurality of setting items supported by the OS 313 can be made as illustrated in FIGS. 9C and 9D. The user can store the print settings made and return to the screen of FIG. 9A by selecting an OK button 902. An apply button 903 in FIG. 9A is a button for storing the print settings. A cancel button 904 is a button for returning to the screen of FIG. 11 without storing the print settings. If an OK button 905 is selected, the print settings are stored and the screen returns to that of FIG. 11. In FIGS. 9A to 9D, print setting items and attribute values independently defined by the printer vendor are unable to be set.

Returning to the description of the print setting extension application 312. The print setting extension application 312 receives print setting information generated based on the print setting capability information that the OS 313 generates from the device capability information, and displays an extension print setting screen illustrated in FIG. 10A. The extension print setting screen can be scrolled by operating the scrollbar as illustrated in FIGS. 10A to 10E, whereby the setting values of various print setting items can be set.

For example, a setting item 1001 "output paper size" in FIG. 10A is print setting information generated from psk: PageMediaSize illustrated in FIGS. 6B-1 and 6B-2. The option "A4" of the output paper size is generated and displayed by the print setting extension application 312 based on print setting information "psk:ISOA4". In such a manner, the print setting extension application 312 converts the device capability information into setting values and displays the extension print setting screen. Since the extension print setting screen is generated from the device capability information including the capability information about the setting items specific to the printer vendor, setting items and setting values not settable on the screens illustrated in FIGS. 9A to 9D, provided by the OS 313 can be set.

Figure 10E:
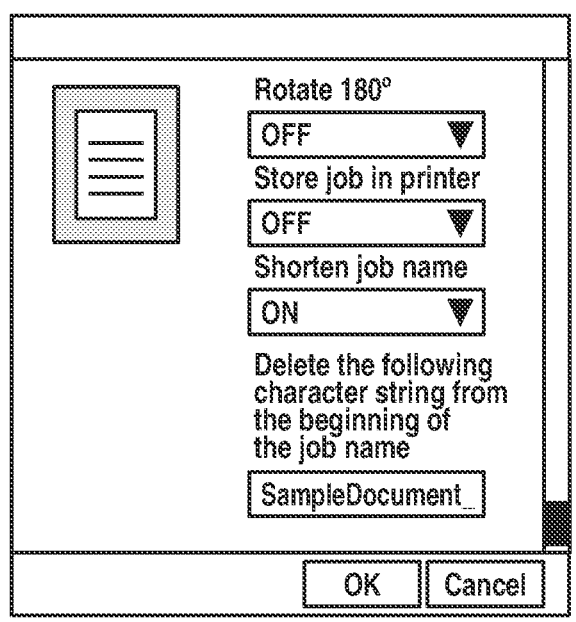
Figure 11:
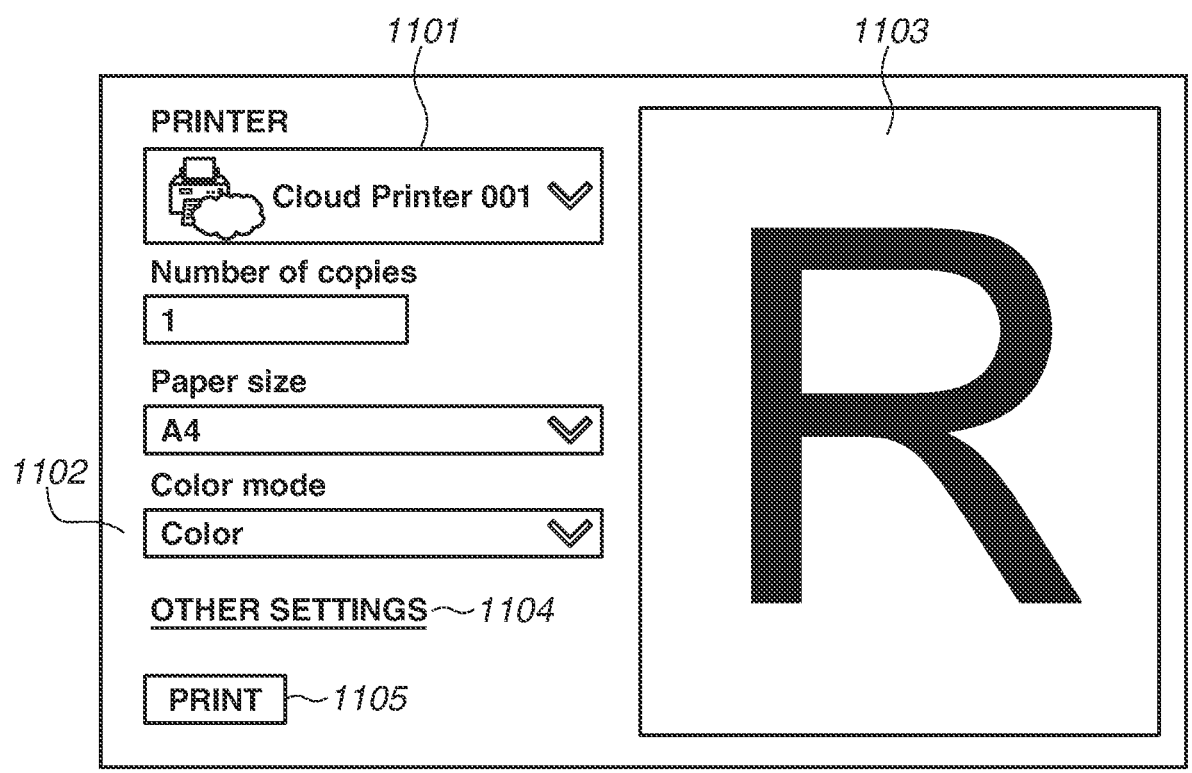
FIG. 11 is a diagram illustrating an example of a print setting screen displayed by a document generation application according to the present embodiment.

The user selects an object 1002 on the screen of FIG. 10A displayed by the print setting extension application 312. The object 1002 is an object for confirming the print settings. The print setting extension application 312 provides a function of freely changing the print settings by the user, and stores changed setting values. Suppose, for example, that the user changes the medium size from A4 to Letter on the UI. In such a case, the print setting information retained by the print setting extension application 312 changes from A4 to Letter. If the object 1002 is selected, the print setting extension application 312 acquires the print setting information processed within the control of the print setting screen from the print setting screen, and passes the print setting information to the OS 313. With the print setting information passed to the OS 313, in step S812, the print setting extension application 312 ends the display of the print setting screen illustrated in FIGS. 10A to 10E. After the completion of the processing of step S812, the print setting screen illustrated in FIG. 11 is displayed. The setting values set by the print setting extension application 312 are reflected on the print setting screen displayed here.

If the user selects an object 1105 on the print setting screen illustrated in FIG. 11, then in step S813, a print instruction is input to the OS 313. The OS 313 performs printing-related processing based on the instruction input via the document generation application 315.

If the instruction to perform printing is given, then in step S814, the OS 313 generates intermediate data, and passes the generated intermediate data and the print setting information edited in the print setting screen to the print setting extension application 312. The intermediate data refers to data generated before conversion into print data, such as page description language (PDL) data. Examples include XML Paper Specification (XPS) data. The print setting information is included in this intermediate data.

In step S815, the print setting extension application 312 receiving the intermediate data and the print setting information from the OS 313 generates print data based on the intermediate data, and generates print capability information based on the print setting information. Examples of the print data include PDL data, such as a Portable Document Format (PDF) file. The print capability information, specifically, is information describing the print setting information in terms of attribute values defined by the IPP.

After the generation of the print data, in step S816, the print setting extension application 312 passes the generated print data and print capability information to the print queue of the OS 313.

The processing of steps S814 to S816 is for the case where the print setting extension application 312 linked with the print queue is installed on the client terminal 101. If the print setting extension application 312 is not installed on the client terminal 101, the client terminal 101 performs the processing of step S817. In step S817, the OS 313 generates XPS data, edits a page layout, converts the XPS data into a predetermined format, and generates print data and print capability information. Examples of the predetermined format include PDF and Printer Working Group (PWG)-Raster.

In step S818, the OS 313 transmits the print data and the print capability information passed from the print setting extension application 312 or the print data and the print capability information generated by the OS 313, to the cloud print service 321 via the print queue.

In step S819, the cloud print service 321 transmits the print data and the print capability information passed from the client terminal 101 to the cloud print compatible printer 104. In the present embodiment, the cloud print service 321 is described to receive the print data and the print capability information and transmits the received print data and print capability information to the cloud print compatible printer 104. However, the cloud print compatible printer 104 can regularly inquire of the cloud print service 321 and acquire unprinted print data and print capability information corresponding to the print data.

In such a manner, the print data on which the print settings made using the print setting extension application 312 are reflected can be transmitted to the cloud print compatible printer 104 via the cloud print service 321.

FIG. 12 is a flowchart illustrating the processing performed by the OS 313 up to the installation of the print setting extension application 312 on the client terminal 101. A program for performing the processing illustrated in this flowchart is stored in the storage unit 214 of the client terminal 101. The processing is implemented by the CPU 212 executing the program.

In step S1201, the CPU 212 displays the screen illustrated in FIG. 4, and accepts a printer search instruction. If the user selects the object 401 illustrated in FIG. 4, the CPU 212 accepts the printer search instruction.

In step S1202, the CPU 212 determines whether the access token for the cloud print service 321 is stored. The client terminal 101 stores an access token for acquiring information from the cloud print service 321 with respect to each user logging in to the client terminal 101. The CPU 212 determines whether the access token linked with the user logged in to the client terminal 101 is stored. If the access token is stored (YES in step S1202), the processing proceeds to step S1206.

If the access token is not stored (NO in step S1202), the processing proceeds to step S1203. In step S1203, the CPU 212 transmits an authentication request to the cloud print service 321. The CPU 212 then receives a URL to be used to display a screen for inputting information for authentication use from the cloud print service 321.

In step S1204, the CPU 212 accesses the received URL and displays the screen for inputting the information for authentication use. Examples of the information for authentication use include a user ID and a password.

In step S1205, the CPU 212 transmits the input information for authentication use to the cloud print service 321, and acquires an access token. If the authentication by the cloud print service 321 fails, the CPU 212 is unable to acquire the access token and the processing illustrated in FIG. 12 ends.

In step S1206, the CPU 212 transmits an acquisition request for information about printers registered in the cloud print service 321 to the cloud print service 321 using the access token. The cloud print service 321 selects information about printers usable by the user identified by the received access token, and transmits the selected information to the client terminal 101. Here, the printer names registered and linked with the printers usable by the user identified by the access token received from the client terminal 101 and the HWIDs of the printers are transmitted to the client terminal 101.

In step S1207, the CPU 212 displays the information about the printers acquired from the cloud print service 321 on the display unit 216 of the client terminal 101. In step S1207, the information about the printers is listed in the area 402 illustrated in FIG. 4.

In step S1208, the CPU 212 determines whether the information about a printer is selected. The CPU 212 repeats the processing of step S1208 until the information about a printer is selected. If the information about a printer is selected (YES in step S1208), the processing proceeds to step S1209.

In step S1209, the CPU 212 transmits an acquisition request for the capability information about the selected printer to the cloud print service 321. Here, the CPU 212 inquires the setting items registered in the OS 313 in advance from the cloud print service 321.

In step S1210, the CPU 212 updates the device capability information stored in the client terminal 101 based on the capability information acquired from the cloud print service 321, and generates a print queue.

In step S1211, the CPU 212 transmits an acquisition request for the extension setup information file 700 to the online support service 351. This acquisition request includes the HWID of the printer.

In step S1212, the CPU 212 determines whether the extension setup information file 700 is successfully acquired. If the extension setup information file 700 is successfully acquired (YES in step S1212), the processing proceeds to step S1213. If the extension setup information file 700 fails to be acquired (NO in step S1212), the processing illustrated in FIG. 12 ends.

In step S1213, the CPU 212 transmits an acquisition request for the print setting extension application 312 described in the acquired extension setup information file 700 to the application management service 331. The CPU 212 acquires the application ID of the print setting extension application 312 from the extension setup information file 700, and transmits the acquisition request for the print setting extension application 312 to the application management service 331 with the acquired application ID specified.

In step S1214, the CPU 212 determines whether the print setting extension application 312 is successfully acquired. If the print setting extension application 312 fails to be acquired (NO in step S1214), the processing illustrated in FIG. 12 ends. If the print setting extension application 312 is successfully acquired (YES in step S1214), the processing proceeds to step S1215.

In step S1215, the CPU 212 installs the acquired print setting extension application 312, links the application ID of the print setting extension application 312 with the print queue, and registers the application ID. The CPU 212 further registers an event indicating notification timing in the OS 313. Here, the CPU 212 registers the event so that if the print queue linked with the print setting extension application 312 is selected on the print setting screen displayed by the document generation application 315, the print setting extension application 312 is notified of the event.

The processing up to the installation of the print setting extension application 312 on the client terminal 101 has been described above.

Processing for making print settings and generating print data using the installed print setting extension application 312 will now be described with reference to FIG. 13. A program for performing the processing illustrated in FIG. 13 is stored in the print setting extension application 312. The program is loaded into the memory 213 of the client terminal 101 and executed by the CPU 212.

In step S1301, the CPU 212 determines whether an event notification is received. The event here refers to the event issued by the OS 313 to notify the print setting extension application 312 that the timing registered in step S1215 of FIG. 12 has come. If the event notification is not received (NO in step S1301), the processing returns to step S1301. If the event notification is received (YES in step S1301), the processing proceeds to step S1302.

In step S1302, the CPU 212 transmits an acquisition request for capability information to the cloud print service 321. The CPU 212 transmits the acquisition request for the capability information as to the setting items set by the print setting extension application 312 to the cloud print service 321. The CPU 212 acquires the capability information about the setting items not acquired in step S1206 of FIG. 12 as well.

In step S1303, the CPU 212 determines whether the acquisition of the capability information is completed. If the acquisition of the capability information is not completed (NO in step S1303), the processing returns to step S1303. If the acquisition of the capability information is completed (YES in step S1303), the processing proceeds to step S1304.

In step S1304, the CPU 212 updates the device capability information using the acquired capability information. By performing the processing in step S1304, the capability information about the setting items not acquired by the OS 313 is also stored into the client terminal 101.

In step S1305, the CPU 212 determines whether an instruction for the print setting extension application 312 to display the print setting screen is accepted. For example, the instruction for the print setting extension application 312 to display the print setting screen is issued based on a user operation for selecting the object 1104 illustrated in FIG. 11. If the instruction to display the print setting screen is not accepted (NO in step S1305), the processing proceeds to step S1309. If the instruction to display the print setting screen is accepted (YES in step S1305), the processing proceeds to step S1306.

In step S1306, the CPU 212 displays the print setting screen illustrated in FIGS. 10A to 10E based on the device capability information updated in step S1304. The CPU 212 then accepts user operations for selecting setting values via the displayed print setting screen.

In step S1307, the CPU 212 determines whether an instruction to end the display of the print setting screen by the print setting extension application 312 is given. If the instruction to end the display of the print setting screen is not given (NO in step S1307), the processing returns to step S1307. If the instruction to end the display of the print setting screen is given (YES in step S1307), the processing proceeds to step S1308.

In step S1308, the CPU 212 edits the print setting information using the setting values selected on the print setting screen displayed by the print setting extension application 312. The CPU 212 then ends the display of the print setting screen by the print setting extension application 312.

In step S1309, the CPU 212 determines whether the print setting extension application 312 receives intermediate data from the OS 313. If intermediate data is not received (NO in step S1309), the processing returns to step S1305. If intermediate data is received (YES in step S1309), the processing proceeds to step S1310.

In step S1310, the CPU 212 generates print data and print capability information based on the intermediate data received by the print setting extension application 312. The CPU 212 generates image data in a predetermined format based on the intermediate data and the print setting information. The CPU 212 generates print capability information described in terms of the attribute values defined by the IPP based on the print setting information. The print capability information can include a free description in addition to the attribute values defined by the IPP. Setting items and attribute values independently defined by the printer vendor can thus be described in the print capability information.

In step S1311, the CPU 212 provides the generated print data and print capability information to the OS 313. The OS 313 transmits the provided print data and print capability information to the cloud print service 321 via the print queue.

The flowchart illustrating the processing for making print settings and generating print data and print capability information using the print setting extension application 312 has been described above.

By performing the foregoing processing, the setting values of the setting items specific to the printer vendor can be set in selecting a print queue linked with a general-purpose cloud printer driver or local printer driver and transmitting print data.

An embodiment of the present invention can be implemented by performing the following processing. The processing includes providing software (program) for implementing the functions of the foregoing embodiment to a system or an apparatus via a network or various storage media, and reading and executing the program code by a computer (or CPU or microprocessing unit [MPU]) of the system or apparatus. In such a case, the computer program and the storage medium storing the computer program constitute the embodiment of the present invention.

An information processing apparatus according to an embodiment of the present invention can, when using a general-purpose printer driver, acquire a printer's capability information as to setting items different from those settable by the general-purpose printer driver.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-068062, filed Apr. 18, 2022, which is hereby incorporated by reference herein in its entirety.

What is claimed is:

1. An information processing apparatus comprising:
a display; and
a controller configured to:
acquire first capability information about a printer configured to receive print data generated by printing software, before generating a print queue corresponding to the printing software, the first capability information including first setting information defined by a predetermined protocol;
accept a selection of the print queue, wherein the selection of the print queue is accepted after the first capability information is acquired, and wherein the selection of the print queue is accepted through a first setting screen displayed on the display by an operating system of the information processing apparatus or a document generation application;
based on the selection of the print queue, acquire:
second capability information about the printer, the second capability information including second setting information defined by the predetermined protocol, wherein the second setting information is different from the first setting information, and
third capability information about the printer, the third capability information including third setting information, wherein the third setting information is not defined by the predetermined protocol; and
cause the display to display a second setting screen based on the first capability information, the second capability information, and the third capability information, wherein the second setting screen includes an object configured to accept a print setting corresponding to the third setting information included in the acquired third capability information.

2. The information processing apparatus according to claim 1,
wherein the first capability information is capability information defined by the predetermined protocol,
wherein the second capability information is capability information defined by the predetermined protocol,
wherein the third capability information is capability information not defined by the predetermined protocol, and
wherein the first capability information, the second capability information, and the third capability information are acquired using a command defined by the predetermined protocol.

3. The information processing apparatus according to claim 2, wherein the printing software is a printer driver configured to generate image data to be transmitted complying with the predetermined protocol.

4. The information processing apparatus according to claim 2, wherein the predetermined protocol is an Internet Printing Protocol.

5. The information processing apparatus according to claim 1, wherein the first capability information, the second capability information, and the third capability information are acquired from a cloud print service.

6. The information processing apparatus according to claim 5, wherein the cloud print service is configured to receive image data from the information processing apparatus and transmit the received image data to the printer.

7. The information processing apparatus according to claim 6, wherein the cloud print service is configured to acquire the first capability information, the second capability information, and the third capability information from the printer.

8. The information processing apparatus according to claim 1, wherein the first setting screen displayed by the operating system or the document generation application is a print setting screen, and
wherein the print setting screen includes a setting item corresponding to the first setting information included in the first capability information.

9. The information processing apparatus according to claim 1, wherein the first setting screen displayed by the operating system or the document generation application is a print setting screen, and
wherein the object configured to accept the print setting is an object configured to accept setting of a setting item not able to be set on the print setting screen.

10. The information processing apparatus according to claim 9, wherein the setting item is a setting item related to a function of binding sheets without using a staple.

11. The information processing apparatus according to claim 1, wherein the controller is further configured to:
receive identification information regarding printers available to a user; and
accept a user selection of a printer to be registered in the information processing apparatus from the printers, the first capability information being acquired after the user selection of the printer to be registered.

12. The information processing apparatus according to claim 11, wherein the identification information is a hardware ID.

13. A control method of an information processing apparatus having a display, the control method comprising:
acquiring first capability information about a printer configured to receive print data generated by printing software, before generating a print queue corresponding to the printing software, the first capability information including first setting information defined by a predetermined protocol;
accepting a selection of the print queue, wherein the selection of the print queue is accepted after the first capability information is acquired, and wherein the selection of the print queue is accepted through a first setting screen displayed on the display by an operating system of the information processing apparatus or a document generation application;
based on the selection of the print queue, acquiring:
second capability information about the printer, the second capability information including second setting information defined by the predetermined protocol, wherein the second setting information is different from the first setting information, and
third capability information about the printer, the third capability information including third setting information, wherein the third setting information is not defined by the predetermined protocol; and
causing the display to display a second setting screen based on the first capability information, the second capability information, and the third capability information, wherein the second setting screen includes an object configured to accept a print setting corresponding to the third setting information included in the third capability information.

14. The control method according to claim 13, wherein the first capability information is capability information defined by the predetermined protocol,
wherein the second capability information is capability information defined by the predetermined protocol,
wherein the third capability information is capability information not defined by the predetermined protocol, and
wherein the first capability information, the second capability information, and the third capability information are acquired using a command defined by the predetermined protocol.

15. The control method according to claim 14, wherein the printing software is a printer driver configured to generate image data to be transmitted complying with the predetermined protocol.

16. The control method according to claim 14, wherein the predetermined protocol is an Internet Printing Protocol.

17. The control method according to claim 13, wherein the first capability information, the second capability information, and the third capability information are acquired from a cloud print service.

18. The control method according to claim 17, wherein the cloud print service is configured to receive image data from the information processing apparatus and transmit the received image data to the printer.

19. The control method according to claim 18, wherein the cloud print service is configured to acquire the first capability information, the second capability information, and the third capability information from the printer.

20. The control method according to claim 13, wherein the first setting screen displayed by the operating system or the document generation application is a print setting screen, and
wherein the print setting screen includes a setting item corresponding to the first setting information included in the first capability information.

21. The control method according to claim 13, wherein the first setting screen displayed by the operating system or the document generation application is a print setting screen, and
wherein the object configured to accept the print setting is an object configured to accept setting of a setting item not able to be set on the print setting screen.

22. The control method according to claim 21, wherein the setting item is a setting item related to a function of binding sheets without using a staple.

23. The control method according to claim 13, further comprising:
receiving identification information regarding printers available to a user; and
accepting a user selection of a printer to be registered in the information processing apparatus from the printers, the first capability information being acquired after the user selection of the printer to be registered.

24. The control method according to claim 23, wherein the identification information is a hardware ID.

25. A non-transitory computer-readable storage medium storing one or more programs including executable instructions for performing a control method of an information processing apparatus having a display, the control method comprising:
acquiring first capability information about a printer configured to receive print data generated by printing software, before generating a print queue corresponding to the printing software, the first capability information including first setting information defined by a predetermined protocol;
accepting a selection of the print queue, wherein the selection of the print queue is accepted after the first capability information is acquired, and wherein the selection of the print queue is accepted through a first setting screen displayed on the display by an operating system of the information processing apparatus or a document generation application;

based on the selection of the print queue, acquiring:
second capability information about the printer, the second capability information including second setting information defined by the predetermined protocol, wherein the second setting information is different from the first setting information, and third capability information about the printer, the third capability information including third setting information, wherein the third setting information is not defined by the predetermined protocol; and causing the display to display a second setting screen based on the first capability information, the second capability information, and the third capability information, wherein the second setting screen includes an object configured to accept a print setting corresponding to the third setting information included in the third capability information.

26. The non-transitory computer-readable storage medium according to claim 25,
wherein the first capability information is capability information defined by the predetermined protocol,
wherein the second capability information is capability information defined by the predetermined protocol,
wherein the third capability information is capability information not defined by the predetermined protocol, and
wherein the first capability information, the second capability information, and the third capability information are acquired using a command defined by the predetermined protocol.

27. The non-transitory computer-readable storage medium according to claim 26, wherein the printing software is a printer driver configured to generate image data to be transmitted complying with the predetermined protocol.

28. The non-transitory computer-readable storage medium according to claim 26, wherein the predetermined protocol is an Internet Printing Protocol.

29. The non-transitory computer-readable storage medium according to claim 25, wherein the first capability information, the second capability information, and the third capability information are acquired from a cloud print service.

30. The non-transitory computer-readable storage medium according to claim 29, wherein the cloud print service is configured to receive image data from the information processing apparatus and transmit the received image data to the printer.

31. The non-transitory computer-readable storage medium according to claim 30, wherein the cloud print service is configured to acquire the first capability information, the second capability information, and the third capability information from the printer.

32. The non-transitory computer-readable storage medium according to claim 25, wherein the first setting screen displayed by the operating system or the document generation application is a print setting screen, and
wherein the print setting screen includes a setting item corresponding to the first setting information included in the first capability information.

33. The non-transitory computer-readable storage medium according to claim 25, wherein the first setting screen displayed by the operating system or the document generation application is a print setting screen, and
wherein the object configured to accept the print setting is an object configured to accept setting of a setting item not able to be set on the print setting screen.

34. The non-transitory computer-readable storage medium according to claim 33, wherein the setting item is a setting item related to a function of binding sheets without using a staple.

35. The non-transitory computer-readable storage medium according to claim 25, the control method further comprising:
receiving identification information regarding printers available to a user; and
accepting a user selection of a printer to be registered in the information processing apparatus from the printers, the first capability information being acquired after the user selection of the printer to be registered.

36. The non-transitory computer-readable storage medium according to claim 35, wherein the identification information is a hardware ID.

* * * * *